United States Patent
Okamoto et al.

(10) Patent No.: US 7,523,980 B2
(45) Date of Patent: Apr. 28, 2009

(54) MOUNTING STRUCTURE AND MOUNTING METHOD FOR RESIN VEHICLE PANEL

(75) Inventors: Kazuo Okamoto, Hiroshima (JP); Yushi Matsuda, Hiroshima (JP); Kunihiko Yoshida, Hiroshima (JP)

(73) Assignee: Mazda Motor Corporation (JP)

( * ) Notice: Subject to any disclaimer, the term of this patent is extended or adjusted under 35 U.S.C. 154(b) by 283 days.

(21) Appl. No.: 11/453,134

(22) Filed: Jun. 15, 2006

(65) Prior Publication Data
US 2007/0001484 A1    Jan. 4, 2007

(30) Foreign Application Priority Data
Jun. 30, 2005   (JP)   ............................ 2005-191185
Jan. 31, 2006   (JP)   ............................ 2006-022346

(51) Int. Cl.
*B60J 9/00*    (2006.01)

(52) U.S. Cl. .................. 296/193.05; 470/8; 470/57; 470/87

(58) Field of Classification Search ................ 296/191, 296/193.05, 901.01; 470/8, 9, 18, 52, 57, 470/87
See application file for complete search history.

(56) References Cited

U.S. PATENT DOCUMENTS 5,525,001  A  *  6/1996  Perkins ...................... 403/157

6,929,313  B2  *  8/2005  Fries et al. ............. 296/193.05

FOREIGN PATENT DOCUMENTS

| JP | 2001 206248 | 7/2001 |
| JP | 2001-206248 | 7/2001 |
| WO | WO 03/080421 | 10/2003 |

OTHER PUBLICATIONS

European Search Report Application EP 06 01 2273 dated Jul. 10, 2007.

* cited by examiner

*Primary Examiner*—Lori L Lyjak
(74) *Attorney, Agent, or Firm*—Studebaker & Brackett PC; Donald R. Studebaker

(57) ABSTRACT

In mounting a resin panel to a car body member, the car body member is provided with a car body member thread part, a portion of the resin panel corresponding to the car body member thread part is formed with a slot extending along a direction of allowance of thermal deformation of the resin panel, and the resin panel is mounted to the car body member using a fastener including: a threaded stem; a first large diameter part provided to one end of the threaded stem and insertable in the slot; and a fastener thread part provided at an end surface of the first large diameter part opposite to the threaded stem and screw-engageable with the car body member thread part.

6 Claims, 25 Drawing Sheets

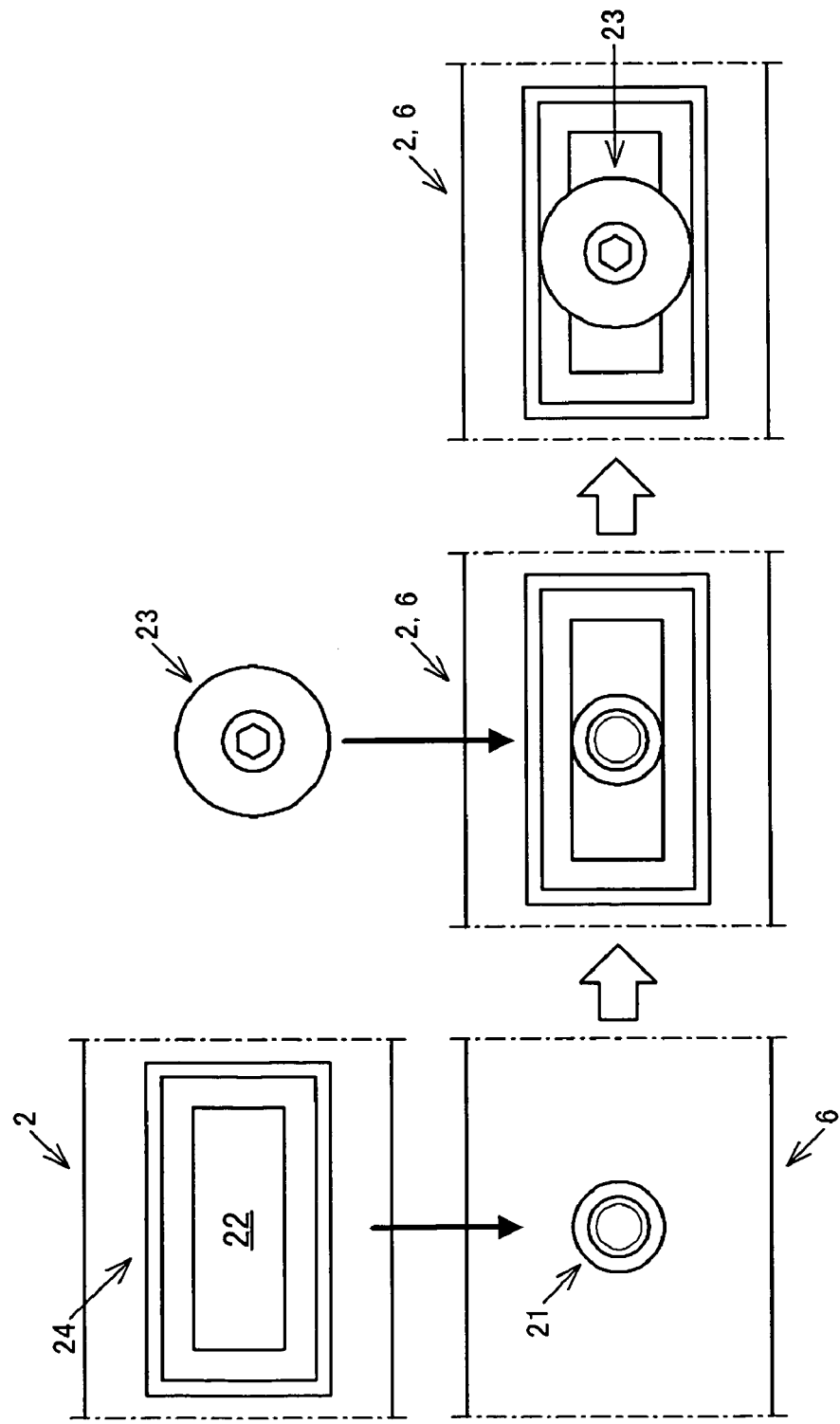

right ←→ left

MOUNTING STRUCTURE AND MOUNTING METHOD FOR RESIN VEHICLE PANEL

CROSS-REFERENCES TO RELATED APPLICATIONS

This application claims priority under 35 USC 119 to Japanese Patent Application No. 2005-191185 filed on Jun. 30, 2005 and Japanese Patent Application No. 2006-022346 filed on Jan. 31, 2006, the entire contents of all of which are incorporated herein by reference.

BACKGROUND OF THE INVENTION (a) Field of the Invention

This invention relates to the technical field of structures and methods for mounting a resin panel to a car body member.

(b) Description of the Related Art

For the purpose of vehicle weight reduction, resin panels, instead of metal panels, have been frequently used in recent years as panels forming vehicles exteriors, such as fender panels. In such cases, the following problem may occur in painting process (a series of process steps including paint spraying, paint baking, paint film drying and cooling).

The painting process on panels, in some cases, is made to the whole car body with a plurality of panels mounted to car body members (normally made of metal) in order to prevent the plurality of panels from making a color difference. In these cases, if some or all of the panels are made of resin, a large difference in thermal expansion coefficient between the resin panel and the car body member (the former having a larger thermal expansion coefficient) causes that the resin panel expands more than the car body member at very high temperatures (for example, one hundred and several dozen degrees Celsius) of paint baking or paint film drying or contracts more when cooled later. As a result, the resin panel might be flexed and deformed.

For example, Unexamined Japanese Patent Application Bulletin No. 2001-206248 discloses a structure capable of absorbing a difference in thermal expansion coefficient between a resin panel and a metal car body member. This structure is a structure for fastening the resin panel and the metal car body member with bolts and nuts, in which the bolt insert holes in the metal car body member are formed of slots and the resin panel and the metal car body member are slidably fastened. With the use of this structure, when the resin panel expands or contracts more than the metal car body member owing to temperature changes, the resin panel moves relative to the metal car body member to allow expansion and contraction of the resin panel.

The structure described in the above bulletin, however, is inferred from the description to be for accommodating minute expansion and contraction in a natural environmental temperature range and to have no ability to accommodate large expansion due to high temperatures as during baking in painting process and contraction due to later cooling.

It can be considered as a method for accommodating large expansion and contraction in painting process that the bolts and nuts are preliminarily loosely fastened for accommodation of large expansion and contraction until the completion of the painting process and fastened to the end after the completion of the painting process. In this case, however, there is the possibility that in carrying or painting the resin panel as mounted to the car body member, the bolts and nuts might be dropped off owing to vibrations. Further, since the resin panel is painted with bolts and nuts preliminarily fastened, a paint film is formed on the surfaces of the bolts and nuts. Therefore, when the bolts and nuts are fastened to the end after the completion of painting process, the turning of the bolts and nuts may cause the paint film thereon to be peeled off, which might impair the appearance of the resin panel.

SUMMARY OF THE INVENTION

The present invention has been made with the foregoing in mind and, therefore, an object of the invention is directed, in mounting a resin panel to a car body member, to prevent fasteners, such as bolts and nuts, for mounting the resin panel to the car body member from being dropped off and avoid peeling-off of the paint film from the fasteners' surfaces and concurrently absorb large expansion and contraction of the resin panel relative to the car body member during painting process or the like.

To attain the above object, the present invention is directed to a resin vehicle panel mounting structure in which a resin panel for vehicles is mounted to a car body member, wherein the car body member is provided with a car body member thread part having internal threads or external threads, a portion of the resin panel corresponding to the car body member thread part is formed with a slot extending along a direction of allowance of thermal deformation of the resin panel, and the resin vehicle panel mounting structure comprises a fastener including: a threaded stem; a first large diameter part provided to one end of the threaded stem and inserted in the slot; and a fastener thread part provided at an end surface of the first large diameter part opposite to the threaded stem and screw-engaged with the car body member thread part.

According to the above structure, when the fastener thread part is screwed forward onto or into the car body member thread part from toward the resin panel through the slot with the resin panel laid on the car body member with their associated portions, the first large diameter part of the fastener is finally tightened against the car body member. In this state, the fastener comes to be firmly secured to the car body member.

If, at this point of time, the fastening nut is screwed onto the threaded stem of the fastener and tightened up, the resin panel and the car body member are securely fastened to each other. At this stage, however, the fastening nut is not yet screwed onto the threaded stem of the fastener (and much less preliminarily screw-held on it).

Then, when the resin panel is subjected to a process inducing a very high temperature condition, such as a painting process (including paint spraying, paint baking, paint film drying and cooling), with the fastener mounted to the car body member (i.e., with the first large diameter part tightened against the car body member), the resin panel expands and contracts relative to the car body member during the process. In this case, since the fastener can move in and along the slot while being guided by the first large diameter part, the resin panel moves relative to the car body member in the direction along the slot. This allows expansion and contraction of the resin panel due to heat during painting or other high-temperature inducing processes, which prevents deformation and other defects of the resin panel.

Some resins exhibit an inequality between the amount of expansion and the amount of contraction due to their thermal history. If a panel made of such a resin and a car body member are previously fully fastened, the difference between the amounts of expansion and contraction may cause a problem such as deformation or residual internal stress of the resin panel. In contrast, since in this invention the resin panel is at last secured to the car body member after the completion of the painting process, such a problem can be eliminated.

After the completion of the high-temperature inducing process as described above, the fastening nut is screwed onto the threaded stem of the fastener and tightened up, so that the resin panel is securely fastened to the car body member. Since, in this manner, the fastening nut is neither screwed onto the threaded stem of the fastener nor tightened up to secure the resin panel to the car body member until the completion of the painting process, this enables the avoidance of peeling-off of the paint film due to turning of the fastening nut and the prevention of spoilage of the appearance of the resin panel.

In the resin vehicle panel mounting structure, the threaded stem of the fastener is preferably provided with a second large diameter part having a larger diameter than the first large diameter part.

The provision of such a second large diameter part enables the resin panel to be preliminarily retained to the car body member. This improves the preliminary retention of the resin panel to the car body member with a simple structure.

In such a case where the threaded stem of the fastener is provided with a second large diameter part as described above, it is preferable that the first large diameter part is tightened against the car body member through screwing of the fastener thread part onto or into the car body member thread part, and that a clearance is created between the second large diameter part and the resin panel with the first large diameter part tightened against the car body member.

Thus, at the stage preceding the secure fastening of the resin panel to the car body member with the fastening nut, the resin panel can smoothly move relative to the car body member during its expansion and contraction and concurrently the preliminary retention of the resin panel to the car body member can be improved.

Furthermore, in such a case where the threaded stem of the fastener is provided with a second large diameter part as described above, it is preferable that a frame-shaped spacer having a higher compressive creep strength than the resin panel is fitted in the slot of the resin panel, that the spacer is formed with a first slot in which the first large diameter part of the fastener is inserted and a second slot in which the second large diameter part thereof is inserted, the first and second slots joining in the direction of thickness of the spacer and extending along the slot of the resin panel, and that a portion of the spacer formed with the first slot is designed to have substantially the same thickness as a portion of the resin panel formed with the slot.

In this case, since the spacer is fitted in the slot of the resin panel, it can be prevented with a simple structure that an excessive axial mounting force acts on the portion of the resin panel around the periphery of the slot, thereby avoiding damage to the resin panel.

The resin vehicle panel mounting structure preferably further comprises a thermal contraction restricting part for restricting thermal contraction of the resin panel over a predetermined amount.

As described above, some resins exhibit an inequality between the amount of expansion and the amount of contraction due to their thermal history (normally, the amount of contraction is larger than the amount of expansion). If the resin panel made of such kind of resin has no thermal contraction restricting part, the position of the resin panel relative to the car body member may significantly vary, after expanded and then contracted, from before expanded. In contrast, if thermal contraction of the resin panel over the predetermined amount is restricted by the thermal contraction restricting part, this prevents the resin panel from being largely offset with respect to the car body member, which improves assembly accuracy.

The thermal contraction restricting part is preferably configured to restrict the thermal contraction of the resin panel over the predetermined amount by the abutment of the fastener screw-engaged with the car body member thread part against one end of the slot of the resin panel.

In this case, the offset of the resin panel with respect to the car body member can be prevented with a simple structure by utilizing the existing elements.

A method for mounting a resin panel for vehicles to a car body member according to the present invention comprises the steps of: providing the car body member with a car body member thread part having internal threads or external threads; forming, in a portion of the resin panel corresponding to the car body member thread part, a slot extending along a direction of allowance of thermal deformation of the resin panel; fabricating a fastener that includes a threaded stem, a first large diameter part provided to one end of the threaded stem and insertable in the slot, and a fastener thread part provided at an end surface of the first large diameter part opposite to the threaded stem and screw-engageable with the car body member thread part; tightening the first large diameter part against the car body member by screwing the fastener thread part onto or into the car body member thread part from toward the resin panel through the slot with the resin panel laid on the car body member with their associated portions in alignment of the car body member thread part with the slot; subjecting the resin panel, with the first large diameter part tightened against the car body member, to a predetermined process by which heat is applied to the resin panel; and after the step of subjecting the resin panel to the predetermined process, screwing a fastening nut onto the threaded stem of the fastener and tightening up the fastening nut to securely fasten the car body member and the resin panel to each other.

If the resin panel is mounted to the car body member according to the above method, the same effects as with the above mounting structure can be obtained.

In the above resin vehicle panel mounting method, like the resin vehicle panel mounting structure, it is preferable that the threaded stem of the fastener is provided with a second large diameter part having a larger diameter than the first large diameter part, and that a clearance is created between the second large diameter part and the resin panel with the first large diameter part tightened against the car body member.

Furthermore, if the predetermined process by which heat is applied to the resin panel comprises drying a paint film formed on the resin panel by painting, high-temperature heat is applied to the entire resin panel for a long time to give it a large thermal deformation. Even in this case, thermal deformation of the resin panel can be allowed with a simple structure, peeling-off of the paint film due to turning of the fastening nut can be avoided and spoilage of the appearance of the resin panel can be prevented.

BRIEF DESCRIPTION OF THE DRAWINGS

FIGS. 20A to 20C are plan views showing a successful case of a work for laying the fender panel on the apron frame, wherein FIG. 20A shows a state before both the members are laid one on another, FIG. 20B shows a state after both the members are laid one on another and FIG. 20C shows a state that the fastener is screwed in the weld nut through the slot and the spacer.

FIGS. 21A and 21B are plan views showing a troublesome case of the work for laying the fender panel on the apron frame, wherein FIG. 21A shows a state before both the members are laid one on another and FIG. 21B shows a state after both the members are laid one on another.

DETAILED DESCRIPTION OF THE INVENTION

An embodiment of the invention will be described below with reference to the drawings. The following description of a preferred embodiment is merely illustrative in nature and is not intended to limit the scope, applications and use of the invention.

Figure 1:
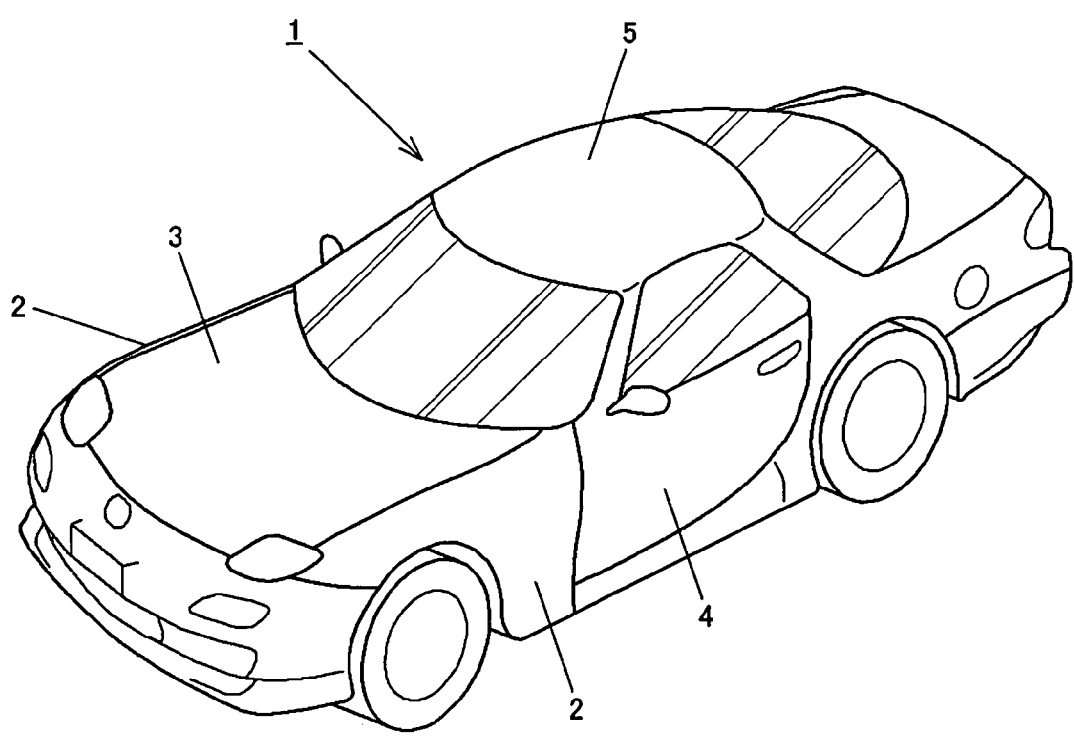
FIG. 1 is a perspective view of a vehicle employing a resin vehicle panel mounting structure according to an embodiment of the present invention.

FIG. 1 is a general perspective view of a vehicle 1 employing a resin vehicle panel mounting structure according to the embodiment of the invention. The exterior of the vehicle 1 is made up of various panels, such as right and left fender panels 2, a hood panel 3, right and left door panels 4 (only the left one shown in FIG. 1) and a roof panel 5. In this embodiment, the fender panels 2 are made of resin for the purpose of weight reduction of the vehicle 1. Namely, the fender panels 2 correspond to resin panels for vehicles in the invention and other panels are made of metal.

Figure 2:
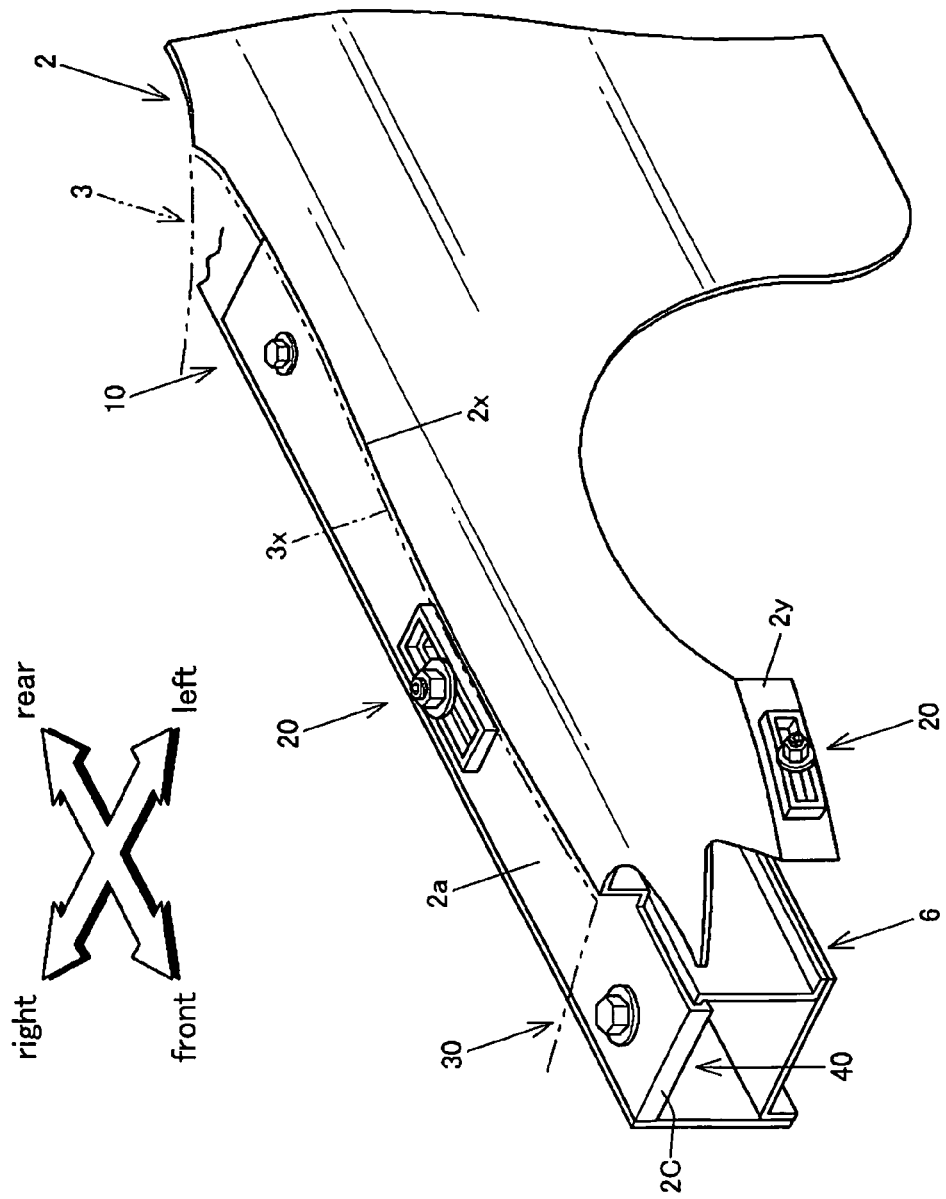
FIG. 2 is an enlarged perspective view showing the mounting relation between a fender panel and an apron frame of the vehicle.

FIG. 2 is an enlarged perspective view showing the mounting relation between the fender panel 2 of the vehicle 1 and an apron frame 6 which is a car body member made of metal. The upper end of the fender panel 2 is provided with a flange 2a extending inwardly and in the vehicle front-to-rear direction. The flange 2a is laid on the top surface of the apron frame 6. Further, the fender panel 2 is mounted, to the apron frame 6, at three mounting parts, i.e., a fixing part 10 near the rear end of the apron frame 6, a slidable part 20 frontward of the fixing part 10 and a finishing fastening part 30 near the front end of the apron frame 6.

In the mounting, the fender panel 2 is allowed to accommodate thermal deformation (expansion and contraction) in the vehicle front-to-rear direction but restricted as to thermal deformation (expansion and contraction) in the vehicle width and vertical directions. The reason for this is to keep a clearance in exterior appearance between the fender panel 2 and the hood panel 3 constant and thereby avoid contact between the fender panel 2 and the hood panel 3 and other aesthetic defects. This avoids spoiling the appearance which is an important factor determinative of the commercial value of the vehicle 1. On the contrary, if, for example, thermal expansion of the fender panel 2 in the vehicle width direction is allowed, the upper edge 2x of the fender panel 2 may push the side edge 3x of the hood panel 3 inwardly of the car body. Alternatively, if vertical thermal expansion of the fender panel 2 is allowed, the upper edge 2x of the fender panel 2 may push up the side edge 3x of the hood panel 3. In these cases, the outline of the vehicle 1 might be deformed. In view of these points, the fixing part 10 near the rear end of the fender panel 2 is provided as a mounting part serving as a reference point for thermal deformation in mounting the fender panel 2 to the apron frame 6 and the slidable part 20 frontward of the fixing part 10 is provided as a mounting part for allowing relative movement of the fender panel 2 to the apron frame 6 in the vehicle front-to-rear direction.

Further, as shown in FIG. 2, a bumper mounting part 2y of the fender panel 2 is also provided with a slidable part 20. Thus, the front part of the fender panel 2 is supported at the bumper mounting part 2y from downward, which is also effective in restraining thermal sagging of the fender panel 2 due to heat applied in painting process.

Figure 3:
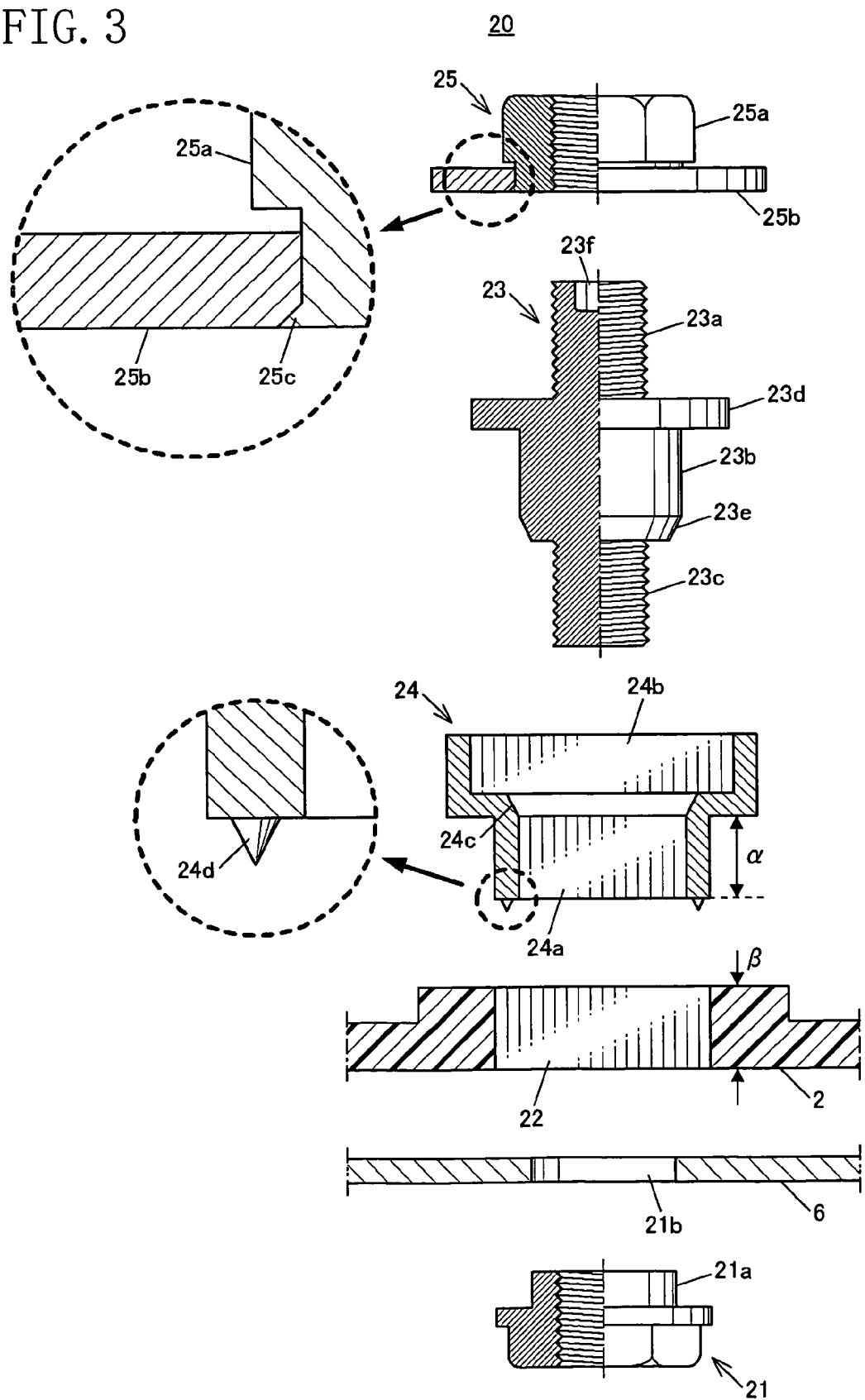
FIG. 3 is a disassembled cross-sectional view of a slidable part, one of three mounting parts for mounting the fender panel to the apron frame, before the mounting.

FIG. 3 is an enlarged cross-sectional view of the slidable part 20 before the mounting. The right-to-left direction in FIG. 3 corresponds to the vehicle right-to-left direction. The apron frame 6 which is a car body member is provided with an internally threaded weld nut 21 (corresponding to a car body member thread part). The weld nut 21 is formed with a guide boss 21a which can be fitted in a mounting hole 21b formed in the top of the apron frame 6 to position the weld nut 21. The fender panel 2 is formed, in the portion corresponding to the weld nut 21, with a slot 22 extending along the direction of allowance of thermal deformation of the fender panel 2 (i.e., the vehicle front-to-rear direction). In securely mounting the fender panel 2 to the apron frame 6, use is made of a fastener 23 which has a threaded stem 23a, a first large diameter part 23b provided to one end of the threaded stem 23a and insertable into the slot 22, and a thread part 23c provided on an end surface of the first large diameter part 23b opposite to the threaded stem 23a and screw-engageable with the weld nut 21 (a fastener thread part screw-engageable with the car body member thread part). The fastener 23 is formed with a hexagonal socket 23f in the end surface located toward the threaded stem 23a.

In this embodiment, the slot 22 has a rectangular shape. A frame-shaped spacer 24 is fitted in the slot 22. The spacer 24 is made of, for example, metal, inorganic compound (such as ceramics) or FRP (Fiber Reinforced Plastic, preferably thermosetting resin) and configured to have a higher compressive creep strength than the fender panel 2. Therefore, the spacer 24 is less likely to plastically deform when undergoing a compressive force than the fender panel 2.

The threaded stem 23a of the fastener 23 is provided with a second large diameter part 23d larger in diameter than the first large diameter 23b and having a diameter to allow abutment on a portion of the fender panel 2 located around the periphery of the slot 22. The lower end of the periphery of the first large diameter part 23b is formed into a tapered portion 23e having the shape of an inverted frustum.

Further, a fastening nut 25 is provided for securely fastening the fender panel 2 and the apron frame 6 to each other. The fastening nut 25 has a nut body 25a and a flange 25b. The flange 25b is engaged at a caulking portion 25c of the nut body 25a to freely turn about the axis of the nut body 25a.

When the fastening nut 25 is screwed on the threaded stem 23a and tightened up, the flange 25b abuts against the top end surface of the spacer 24.

Figure 4A:
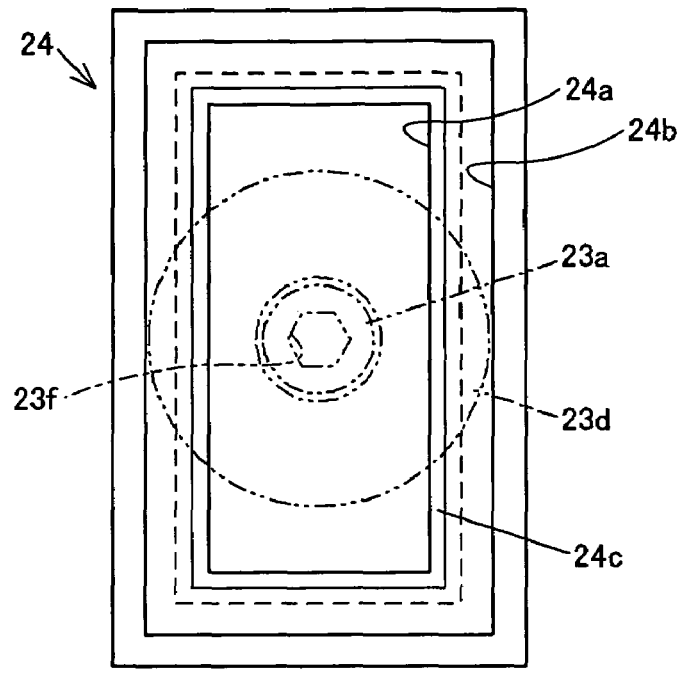
FIG. 4A is a plan view of a spacer for use in the slidable part and FIG. 4B is a bottom view of the spacer.
Figure 4B:
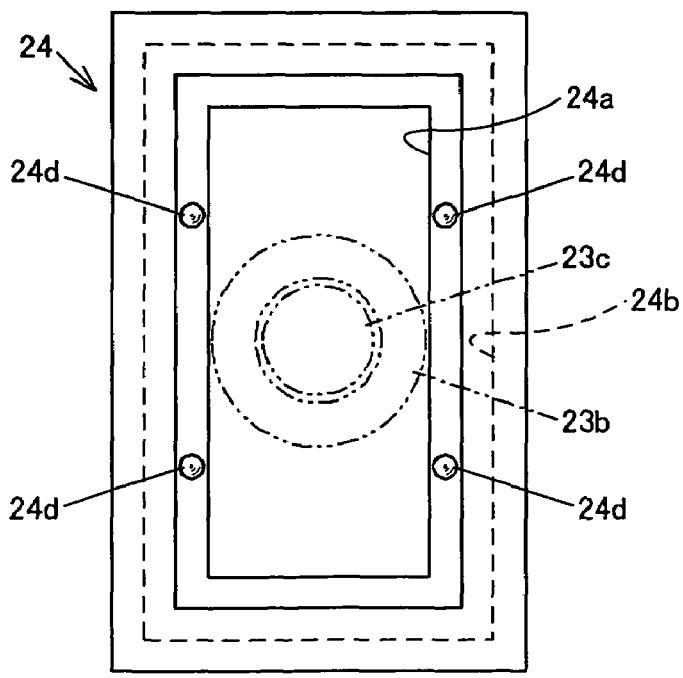

As shown in FIGS. 3 and 4, the spacer 24 is formed with a lower slot 24a (corresponding to a first slot) in which the first large diameter part 23b of the fastener 23 is to be inserted and an upper slot 24b (corresponding to a second slot) in which the second large diameter part 23d is to be inserted so that both the slots 24a and 24b join each other in the direction of thickness of the spacer 24 and extend along the slot 22 of the fender panel 2. The thickness a of a lower portion of the spacer 24 formed with the lower slot 24a is designed to be substantially equal to the thickness β of a portion of the fender panel 2 formed with the slot 22 (the thickness of the portion thereof located around the periphery of the slot 22). The upper edge of the lower slot 24a is chamfered into a beveled surface 24c. The beveled surface 24c and the tapered portion 23e of the fastener 23 successfully guide the thread part 23c into the weld nut 21 in inserting the fastener 23 into the lower slot 24a of the spacer 24.

Figure 9:
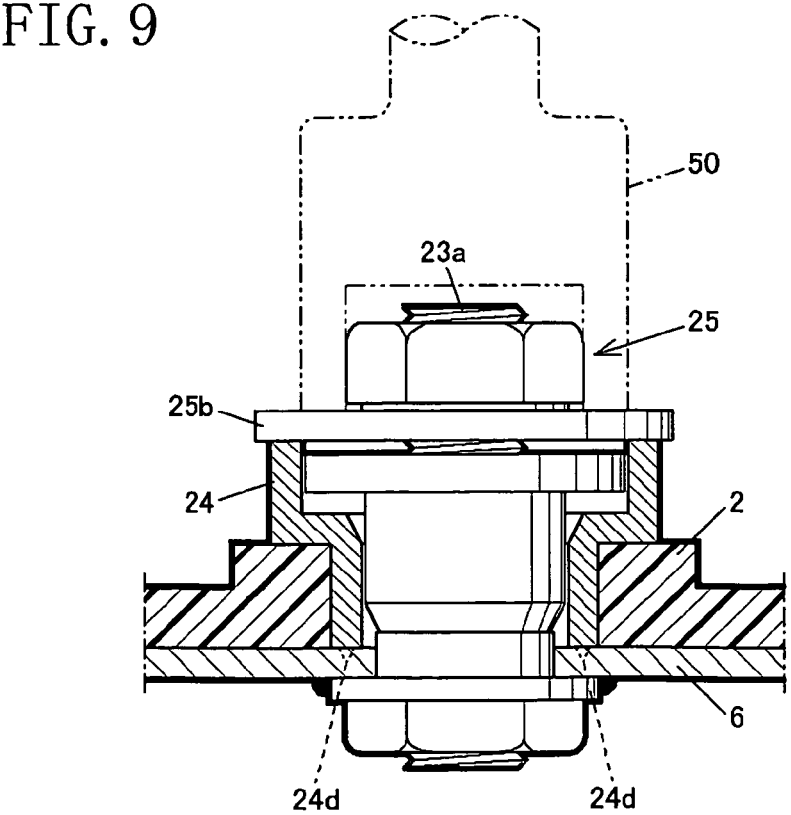
FIG. 9 is a cross-sectional view of the slidable part, showing still another state that a fastening nut is screwed on a threaded stem of the fastener and tightened up to securely fasten the fender panel and the apron frame.

Furthermore, the bottom end surface of the spacer 24 is provided with a plurality of pointed projections 24d. As shown in FIG. 9, when the spacer 24 is pressed against the fender panel 2 or the apron frame 6 by the flange 25b of the fastening nut 25, the pointed projections 24d bite into the apron frame 6 to prevent the spacer 24 or the fender panel 2 from being torsionally deformed owing to axial torque during tightening of the fastening nut 25.

Next, a description will be given to a method for mounting the resin fender panel 2 to the metal apron frame 6 in the slidable part 20 with reference to FIGS. 5 to 9.

Figure 5:
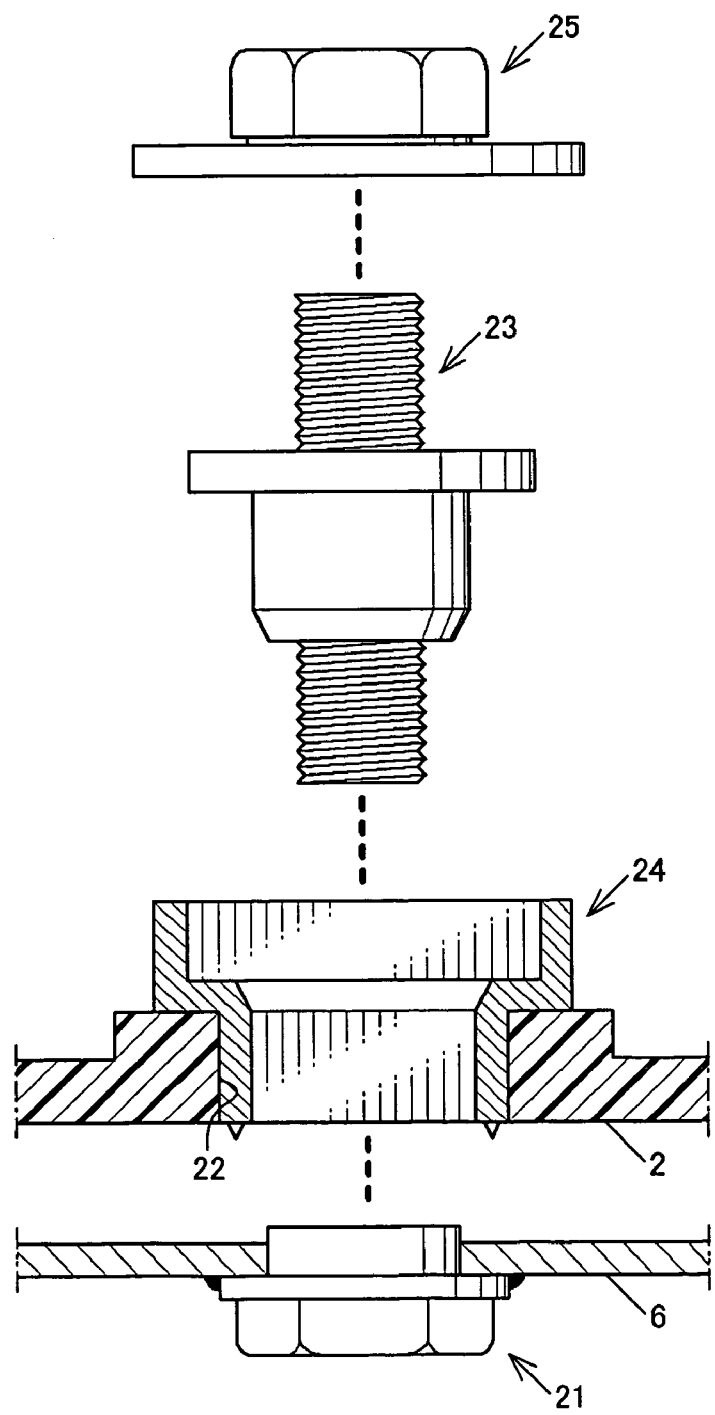
FIG. 5 is a cross-sectional view of the slidable part, showing a state that the spacer is fitted in a slot of the fender panel and a weld nut is joined to a mounting hole of the apron frame.

First, in a car body assembly plant, as shown in FIG. 5, the frame-shaped spacer 24 is inserted into the slot 22 of the fender panel 2. Further, the weld nut 21 is joined to the mounting hole 21b of the apron frame 6.

Figure 6:
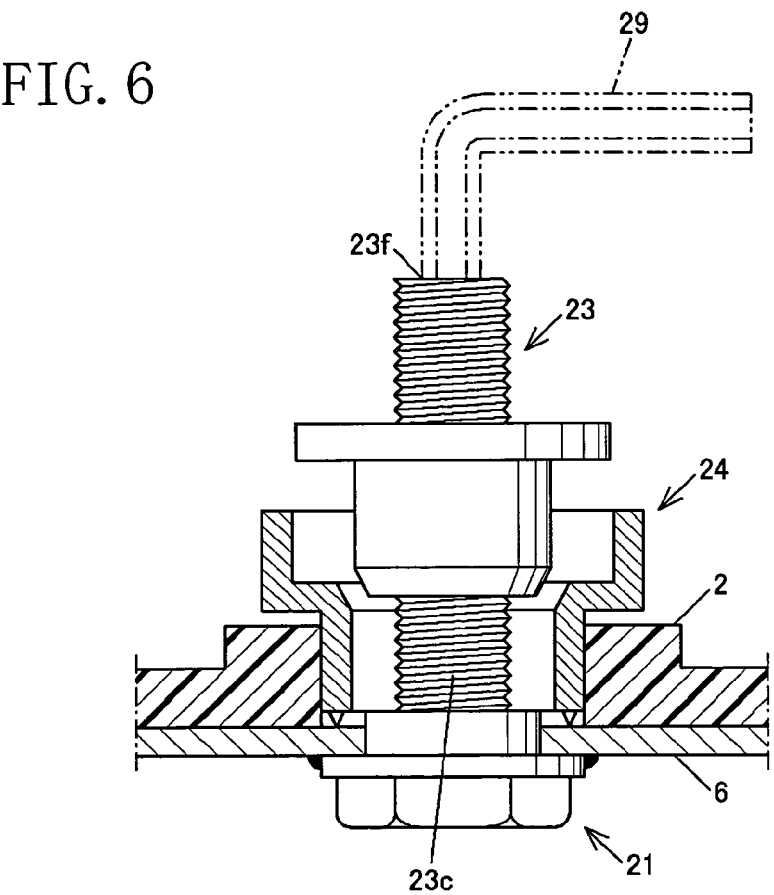
FIG. 6 is a cross-sectional view of the slidable part, showing another state that the fender panel is laid on the apron frame and a thread part of a fastener has begun to be screwed into the weld nut.
Figure 7:
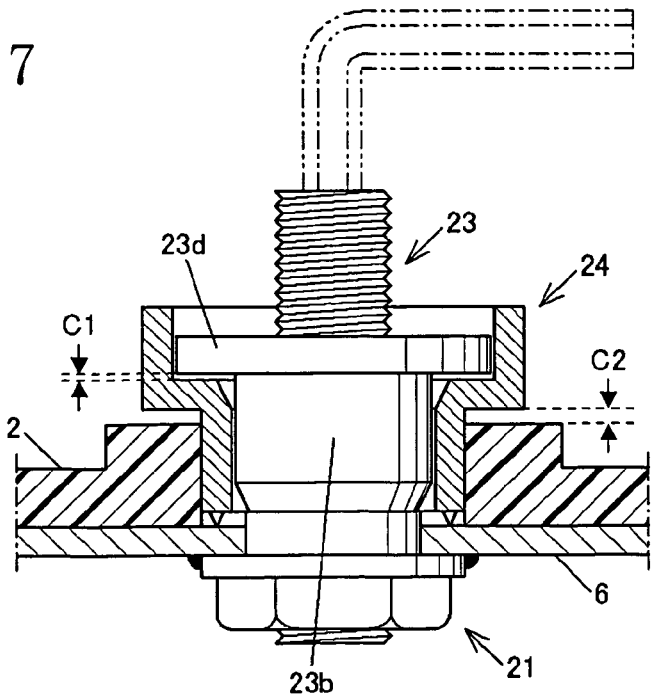
FIG. 7 is a cross-sectional view of the slidable part, showing still another state that the thread part of the fastener is fully screwed in the weld nut to tighten a first large diameter part of the fastener against the weld nut.

Subsequently, as shown in FIG. 6, the fender panel 2 is laid on the apron frame 6 with their associated portions in alignment of the weld nut 21 with the slot 22. In this state, for example, an Allen wrench 29 is engaged in the hexagonal socket 23f of the fastener 23 and used to screw the thread part 23c of the fastener 23 into the weld nut 21. The screwing is continued, as shown in FIG. 7, until the first large diameter part 23b is tightened against the apron frame 6 (the weld nut 21 united to the apron frame 6 in the shown example). The mounting part is designed so that in this tightened state, a clearance is created between the second large diameter part 23d and the fender panel 2. More specifically, in this embodiment, a clearance C1 is created between the second large diameter part 23d and the spacer 24 and a clearance $C_2$ is created between the spacer 24 and the fender panel 2.

Figure 8:
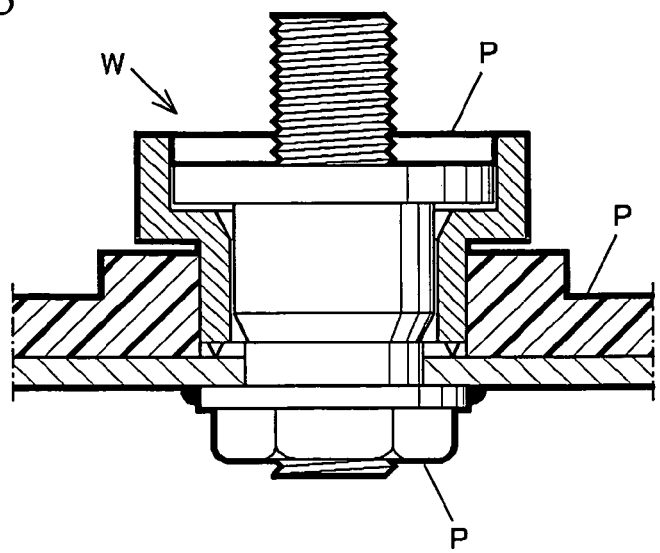
FIG. 8 is a cross-sectional view of the slidable part, showing still another state that a paint film is formed on a work surface.

Then, the obtained work formed of the fender panel 2 and the apron frame 6 (in which a fastener 33 has not yet been screwed in a weld nut 31 in the finishing fastening part 30 (see FIG. 15) but the fender panel 2 and the apron panel 6 are securely fastened by a fastener in the fixing part 10) is subjected to a predetermined process by which heat is applied thereto, i.e., a painting process composed of a series of process steps including paint spraying, paint baking, paint film drying and cooling. As a result, as shown in FIG. 8, a paint film P is formed on the surface of the work W.

As described in the after-mentioned first referential embodiment, the painting process is carried out on the whole car body to which right and left fender panels 2 and the other metal panels (including a hood panel 3, right and left door panels 4 and a roof panel 5) are mounted.

Thereafter, as shown in FIG. 9, the fastening nut 25 is screwed onto the threaded stem 23a of the fastener 23 and tightened up to securely fasten the fender panel 2 and the apron frame 6 to each other. Specifically, the flange 25b of the fastening nut 25 is pressed against the top end surface of the spacer 24 so that the pointed projections 24d provided on the bottom end surface of the spacer 24 bite into the apron frame 6. Since the thickness a of the lower portion of the spacer 24 formed with the lower slot 24a is substantially equal to the thickness β of the portion of the fender panel 2 formed with the slot 22, when the pointed projections 24d bite for the entire length into the apron frame 6 to bring the bottom end surface of the spacer 24 into abutment against the apron frame 6, the bottom of a portion of the side wall of the spacer 24 corresponding to the upper slot 24b (the bottom of a vertically extending portion of the spacer 24 located above the portion of the fender panel 2 located around the periphery of the slot 22) abuts on the portion of the fender panel 2 located around the periphery of the slot 22. As a result, the fender panel 2 and the apron frame 6 are secured to each other through the spacer 24.

According to this embodiment, since the thread part 23c of the fastener 23 is screwed into the weld nut 21 from toward the fender panel 2 through the slot 22 until the first large diameter part 23b is tightened against the apron frame 6, the fastener 23 is firmly mounted to the apron frame 6.

Just after the fastener 23 is mounted to the apron frame 6 (i.e., the first large diameter part 23b is tightened against the apron frame 6), the fastening nut 25 is not yet mounted to the fastener 23. In other words, the fender panel 2 and the apron frame 6 are not yet fastened to each other. When in this state the work undergoes a painting process inducing a very high temperature condition, the fender panel 2 expands or contracts relative to the apron frame 6 during the painting process. Since during the time the fastener 23 can move in and along the slot 22 while being guided by the first large diameter part 23b, the fender panel 2 moves relative to the apron frame 6 in the direction along the slot 22. Therefore, expansion and contraction of the fender panel 2 due to heat applied during the painting process can be allowed, thereby preventing deformation and other defects of the fender panel 2.

Some resins exhibit an inequality between the amount of expansion and the amount of contraction due to their thermal history. If the panel made of such a resin and the car body member are previously fully fastened, the difference between the amounts of expansion and contraction may cause a problem such as deformation or residual internal stress of the fender panel 2. In contrast, since in this invention the fender panel 2 is at last secured to the apron frame 6 after the completion of the painting process, such a problem can be eliminated.

After the completion of the high-temperature inducing process as described above, the fastening nut 25 is screwed onto the threaded stem 23a of the fastener 23 and tightened up, so that the fender panel 2 is securely fastened to the apron frame 6. Since, in this manner, the fastening nut 25 is not preliminarily held on the threaded stem 23a of the fastener 23 before the painting process on the work and it is screwed onto the threaded stem 23a and tightened up to secure the fender panel 2 to the apron frame 6 only after the completion of the painting process, this enables the avoidance of peeling-off of the paint film due to turning of the fastening nut 25 and the prevention of spoilage of the appearance of the fender panel 2.

Further, since the slot 22 is formed along the direction of allowance of thermal deformation of the fender panel 2, thermal deformation of the fender panel 2 prior to secure fastening to the apron frame 6 with the fastening nut 25 can be allowed and guided with a simple structure.

Furthermore, since the fastener 23 is provided with the second large diameter part 23d, this improves the preliminary retention of the fender panel 2 to the apron frame 6 with a simple structure. Furthermore, the first large diameter part 23b is tightened against the apron frame 6 through full screwing of the thread part 23c of the fastener 23 into the weld nut 21 and a clearance is created between the second large diameter part 23d and the fender panel 2 with the first large diameter part 23b tightened against the apron frame 6. Therefore, at the stage preceding the secure fastening of the fender panel 2 to the apron frame 6 with the fastening nut 25, the fender panel 2 can smoothly move relative to the apron frame 6 during its expansion and contraction and concurrently the preliminary retention of the fender panel 2 to the apron frame 6 can be improved.

Furthermore, since the frame-shaped spacer 24 is fitted in the slot 22 of the fender panel 2, it can be prevented with a simple structure that an excessive axial mounting force acts on the portion of the fender panel 2 around the periphery of the slot 22, thereby avoiding damage to the fender panel 2.

Thus, even if the predetermined process by which heat is applied to the fender panel 2 is a painting process so that high-temperature heat is applied to the entire fender panel 2 for a long time to give it a large thermal deformation, thermal deformation of the fender panel 2 prior to secure fastening to the apron frame 6 with the fastening nut 25 can be allowed with a simple structure, peeling-off of the paint film due to turning of the fastening nut 25 during the secure fastening can be avoided and spoilage of the appearance of the fender panel 2 can be prevented.

Furthermore, since the flange 25b of the fastening nut 25 can be freely turned, the axial torque of the fastening nut 25 is less likely to act through the flange 25b on the spacer 24 throughout the screwing onto the threaded stem 23a of the fastener 23, which restrains torsion and deformation of the spacer 24. The flange 25b may be a separate part (e.g., washer) from the fastening nut 25.

Figure 10:
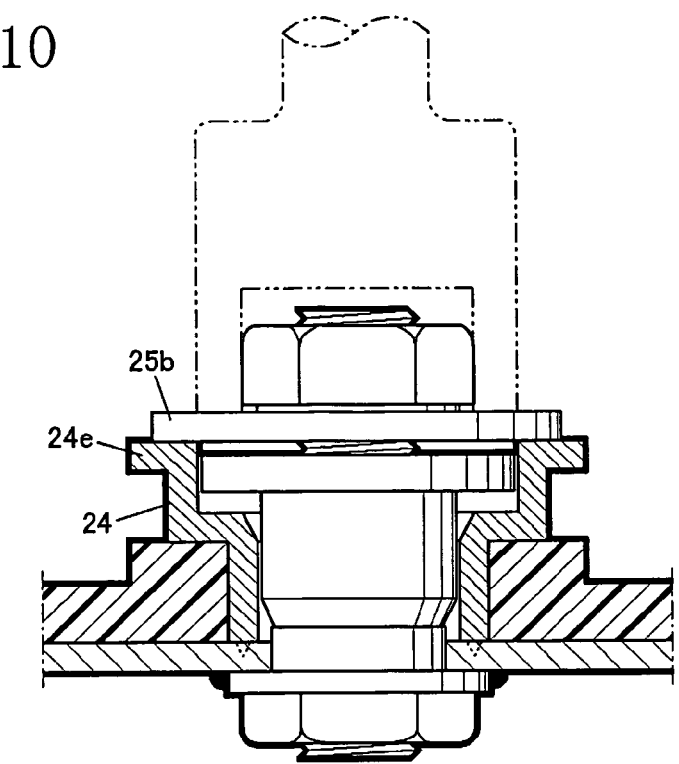
FIG. 10 is a corresponding view of FIG. 9, showing another example of the spacer.

As shown in FIG. 10, if the top end part of the spacer 24 is provided with a flange 24e increasing the outer diameter of the spacer 24, the flange 25b of the nut 25 can be better pressed against the spacer 24.

Figure 11:
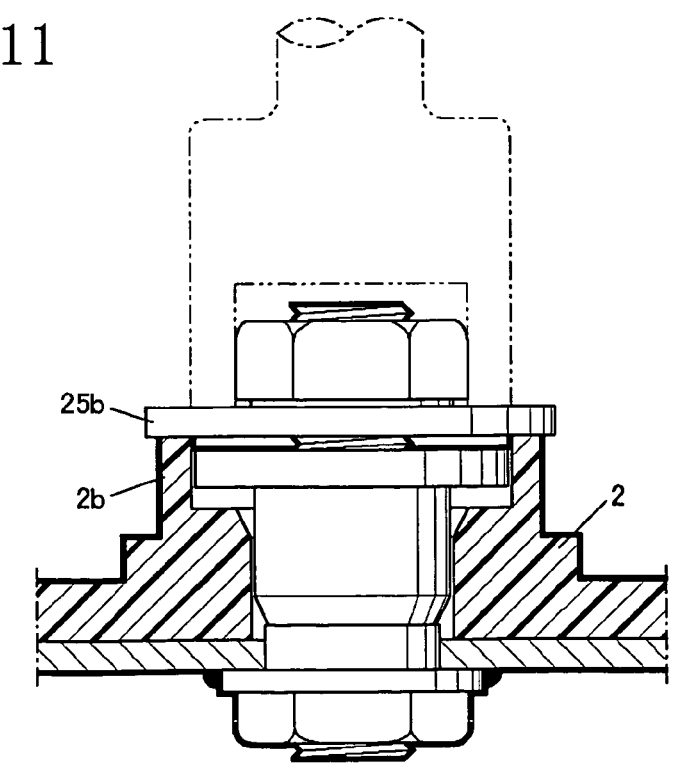
FIG. 11 is a corresponding view of FIG. 9, showing an example in which no spacer is used.

As shown in FIG. 11, the spacer 24 may not be used depending on circumstances. In the example shown in FIG. 11, an upward extension 2b upstands from the portion of the fender panel 2 surrounding the slot 22 and the flange 25b of the nut 25 is pressed against the top end surface of the upper extension 2b. In this case, a rubber or resin washer may be interposed between the flange 25b of the nut 25 and the top end surface of the upward extension 2b.

Next, a description will be given to a mounting method for the finishing fastening part 30 with reference to FIGS. 12 to 17.

Figure 12:
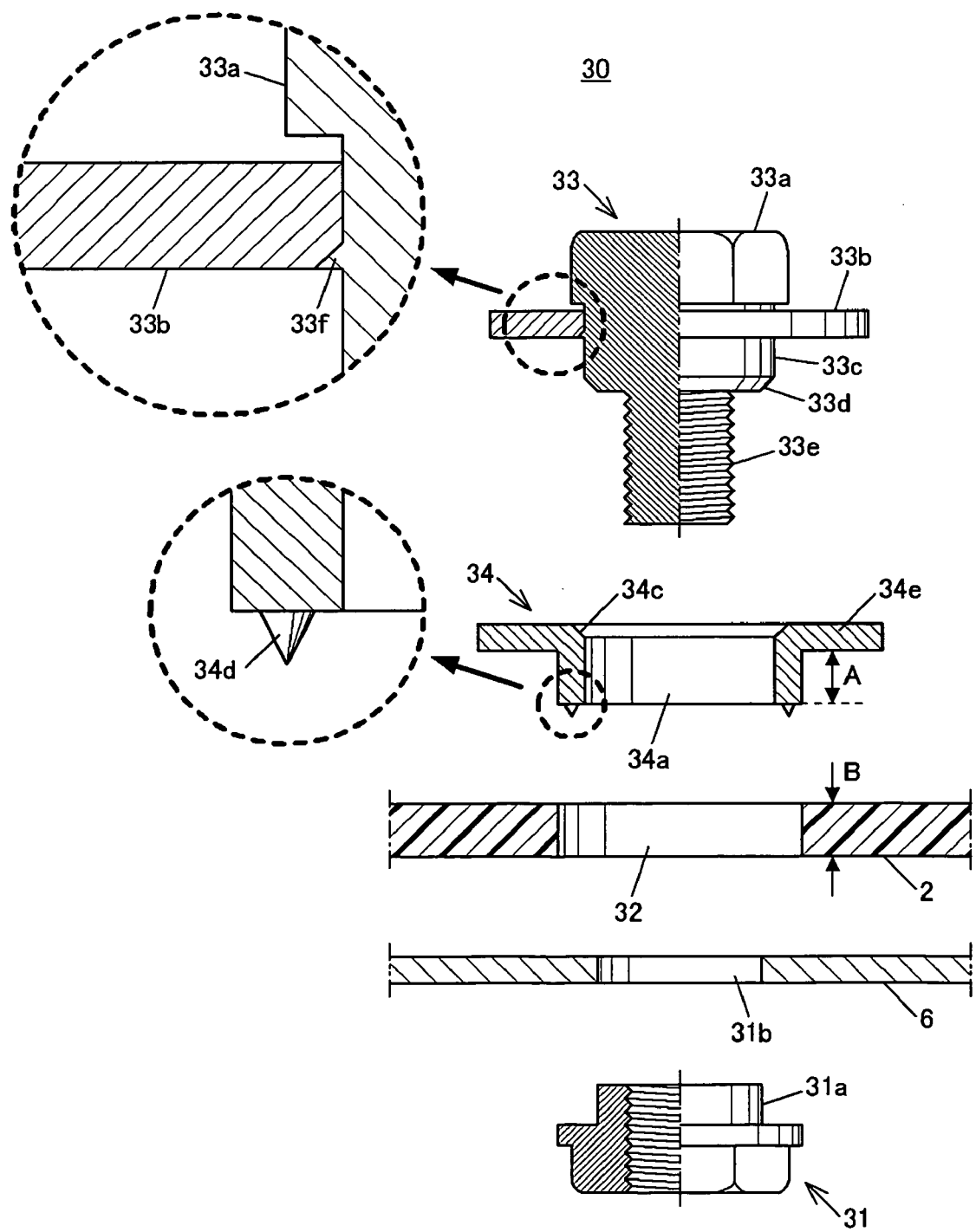
FIG. 12 is a disassembled cross-sectional view of a finishing fastening part, one of the three mounting parts for mounting the fender panel to the apron frame, before the mounting.
Figure 13:
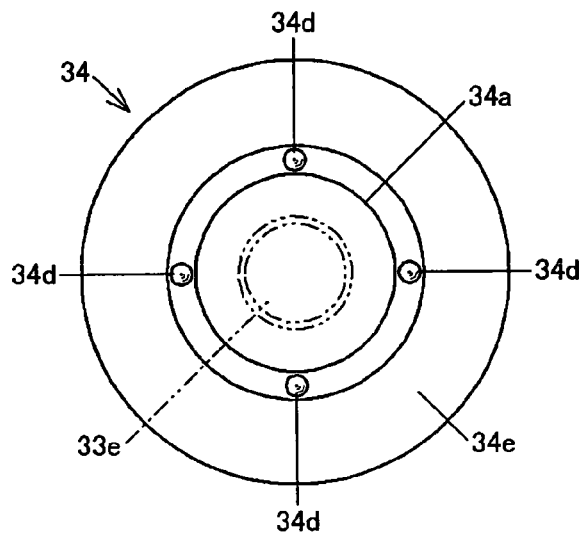
FIG. 13 is a bottom view of a spacer for use in the finishing fastening part.
Figure 14:
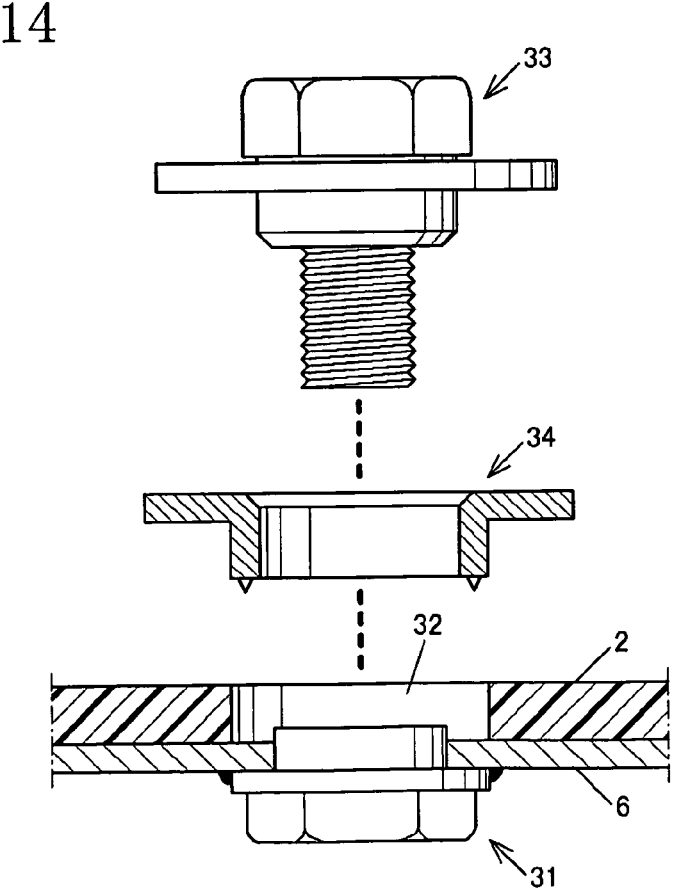
FIG. 14 is a cross-sectional view of the finishing fastening part, showing a state that a weld nut is joined to a mounting hole of the apron frame and the fender panel is laid on the apron frame.

First, in a car body assembly plant, as shown in FIGS. 12 to 14, the guide boss 31a of the weld nut 31 is inserted, like the slidable part 20, into a mounting hole 31b formed in the top of the apron frame 6 and the weld nut 31 is joined to the apron frame 6 (see FIG. 14 for its joined state).

Figure 15:
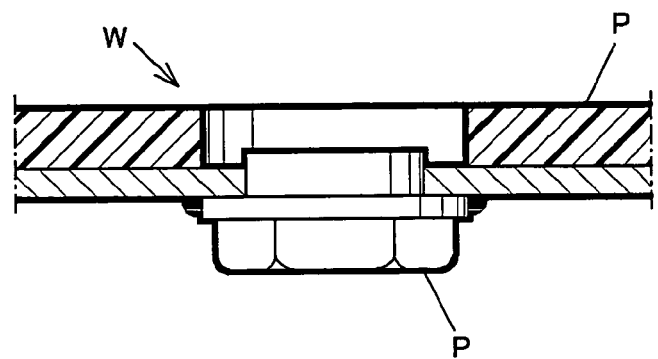
FIG. 15 is a cross-sectional view of the finishing fastening part, showing another state that a paint film is formed on a work surface.

Subsequently, as shown in FIG. 14, the fender panel 2 is laid on the apron frame 6 with their associated portions in alignment of the weld nut 31 with a round hole 32 formed in the fender panel 2. Then, the obtained work formed of the fender panel 2 and the apron frame 6 (in which the fastener 23 is screwed in the weld nut 21 in the slidable part 20 as described above) is subjected to the predetermined process by which heat is applied, i.e., the above painting process. As a result, as shown in FIG. 15, the paint film P is formed on the surface of the work W.

Figure 16:
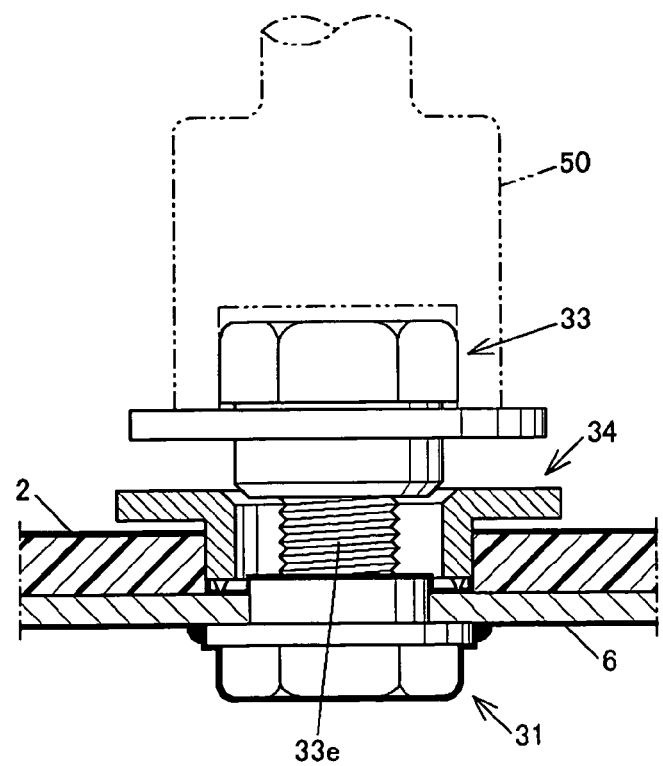
FIG. 16 is a cross-sectional view of the finishing fastening part, showing still another state that the spacer is fitted in a round hole of the fender panel and a thread part of a fastener has begun to be screwed into the weld nut.
Figure 17:
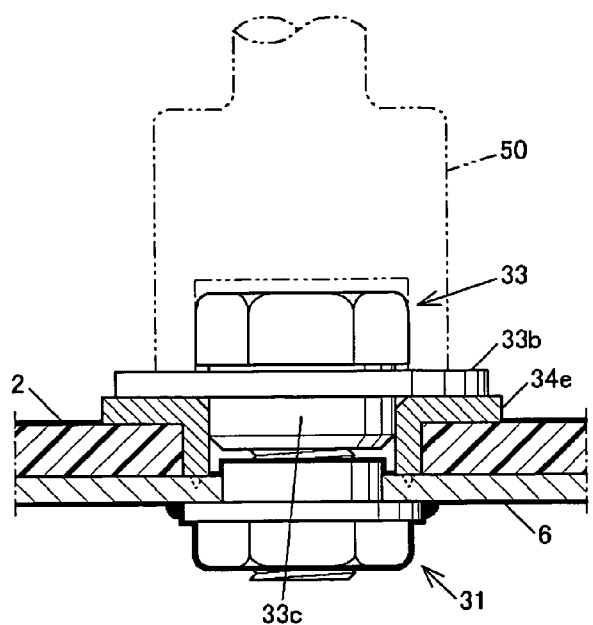
FIG. 17 is a cross-sectional view of the finishing fastening part, showing still another state that the fender panel and the apron frame are securely fastened by the fastener.

Thereafter, as shown in FIG. 16, a spacer 34 is fitted into the round hole 32 of the fender panel 2, a thread part 33e and a large diameter part 33c of the fastener 33 are inserted into a round hole 34a of the spacer 34 and the thread part 33e is screwed into the weld nut 31 by turning a head 33a of the fastener 33 with a fastening tool 50. Thus, part of the fender panel 2 is securely fastened to the apron frame 6 (see FIG. 17). Specifically, before the large diameter part 33c of the fastener 33 comes into contact with the apron frame 6 (the weld nut 31 united to the apron frame 6 in the shown example), a flange 33b of the fastener 33 abuts against and pushes down a flange 34e of the spacer 34 and then secures the fender panel 2 to the apron frame 6 through the flange 34e.

The spacer 34 is formed with a plurality of pointed projections 34d acting in the same manner as the pointed projections 24d of the spacer 24 and a beveled surface 34c acting in the same manner as the beveled surface 24c of the spacer 24. The thickness A of a portion of the spacer 34 extending below from the flange 34e is designed to be substantially equal to the thickness B of a portion of the fender panel 2 formed with the round hole 32.

The flange 33b, as in the fastening nut 25, is engaged at a caulking portion 33f formed above the large diameter part 33c of the fastener 33 to freely turn about the axis thereof. The lower end of the periphery of the large diameter part 33c is formed into a tapered portion 33d acting in the same manner as the tapered portion 23e of the fastener 23.

Figure 18:
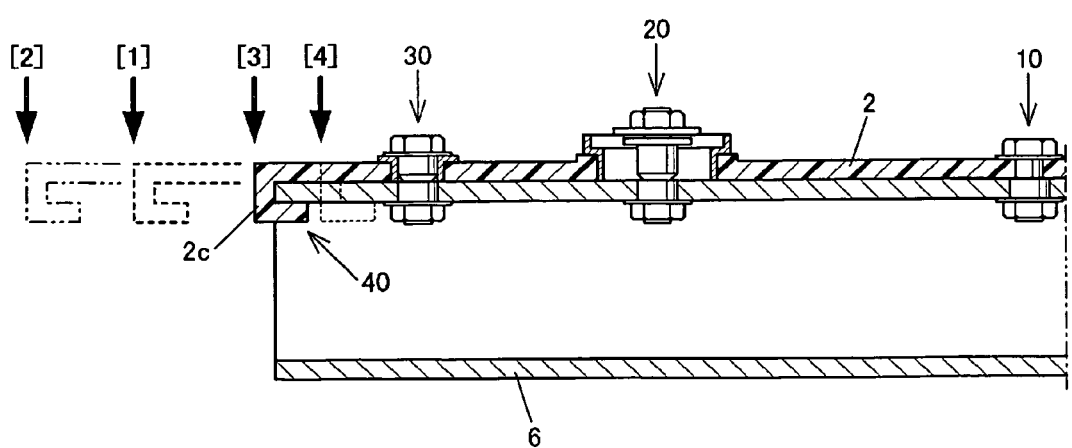
FIG. 18 is a longitudinally cross-sectional view of the fender panel and the apron frame, illustrating the structure and effects of an example of a thermal contraction restricting part.

As shown in FIGS. 2 and 18, the front end of the fender panel 2 is formed into a turned-back portion 2c and hooked over the top plate of the apron frame 6 to form a thermal contraction restricting part 40 for restricting thermal contraction of the fender panel 2 over a predetermined amount. Though the turned-back portion 2c of the fender panel 2 is at a position [1] before the fender panel 2 is subjected to the predetermined process by which heat is applied thereto, it thermally expands to a thermally expanded position [2] when exposed to heat and then contracts to a contracted position [4] in the course of nature when cooled. In this embodiment, however, the stop structure of the thermal contraction restricting part 40 allows the turned-back portion 2c of the fender panel 2 to stay at the front end of the apron frame 6 even after cooled. Thus, the round hole 32 of the fender panel 2 in the finishing fastening part 30 can be aligned with the weld nut 31 mounted to the apron frame 6. Since in this manner thermal contraction of the fender panel 2 over the predetermined amount can be restricted, this prevents the fender panel 2 from being largely offset with respect to the apron frame 6, which prevents the creation of an unnecessary gap and improves assembly accuracy.

Figure 19:
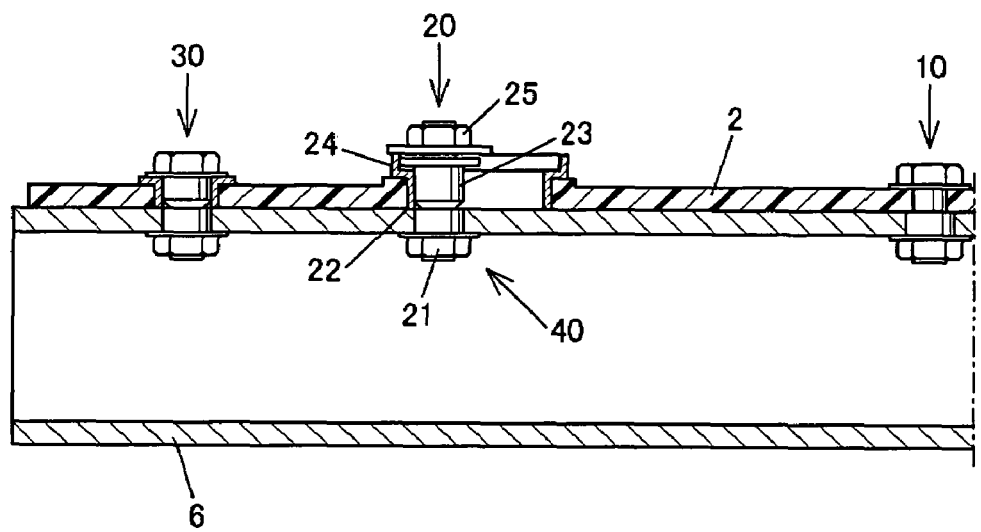
FIG. 19 is a corresponding view of FIG. 18, illustrating the structure and effects of another example of the thermal contraction restricting part.

Instead of the structure of the thermal contraction restricting part 40 using the turned-back portion 2c, as shown in FIG. 19, the thermal contraction restricting part 40 may be configured to restrict thermal contraction of the fender panel 2 over the predetermined amount by the abutment of the first large diameter part 23b of the fastener 23 screw-engaged with the weld nut 21 in the slidable part 20 against one end of the slot 22 of the fender panel 2 (one end of the lower slot 24a of the spacer 24). This configuration is preferable because it provides the above effects with a simple structure while utilizing the existing elements.

Figures 21A, 21B:
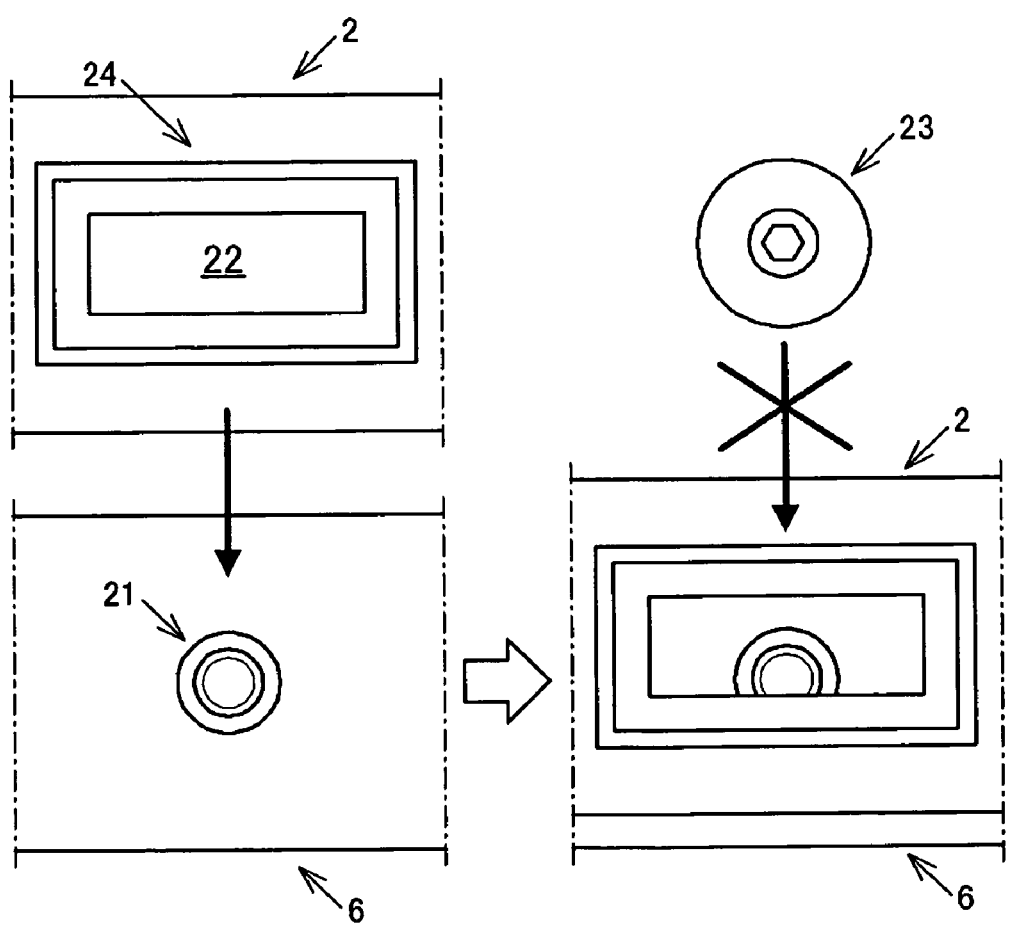

If, as shown in FIGS. 20A to 20C, the weld nut 21 comes just under the slot 22 and the spacer 24 when the fender panel 2 is laid on the apron frame 6, the fastener 23 can be easily screwed into the weld nut 21 through the slot 22 and the spacer 24. However, depending on the tuning of jigs or jig holes, for example, as shown in FIG. 21B, the apron frame 6 and the fender panel 2 may be offset from each other in the vehicle width direction (the vertical direction in FIG. 21B), which might fail to screw the fastener 23 into the weld nut 21 through the slot 22 and the spacer 24.

Figure 22:
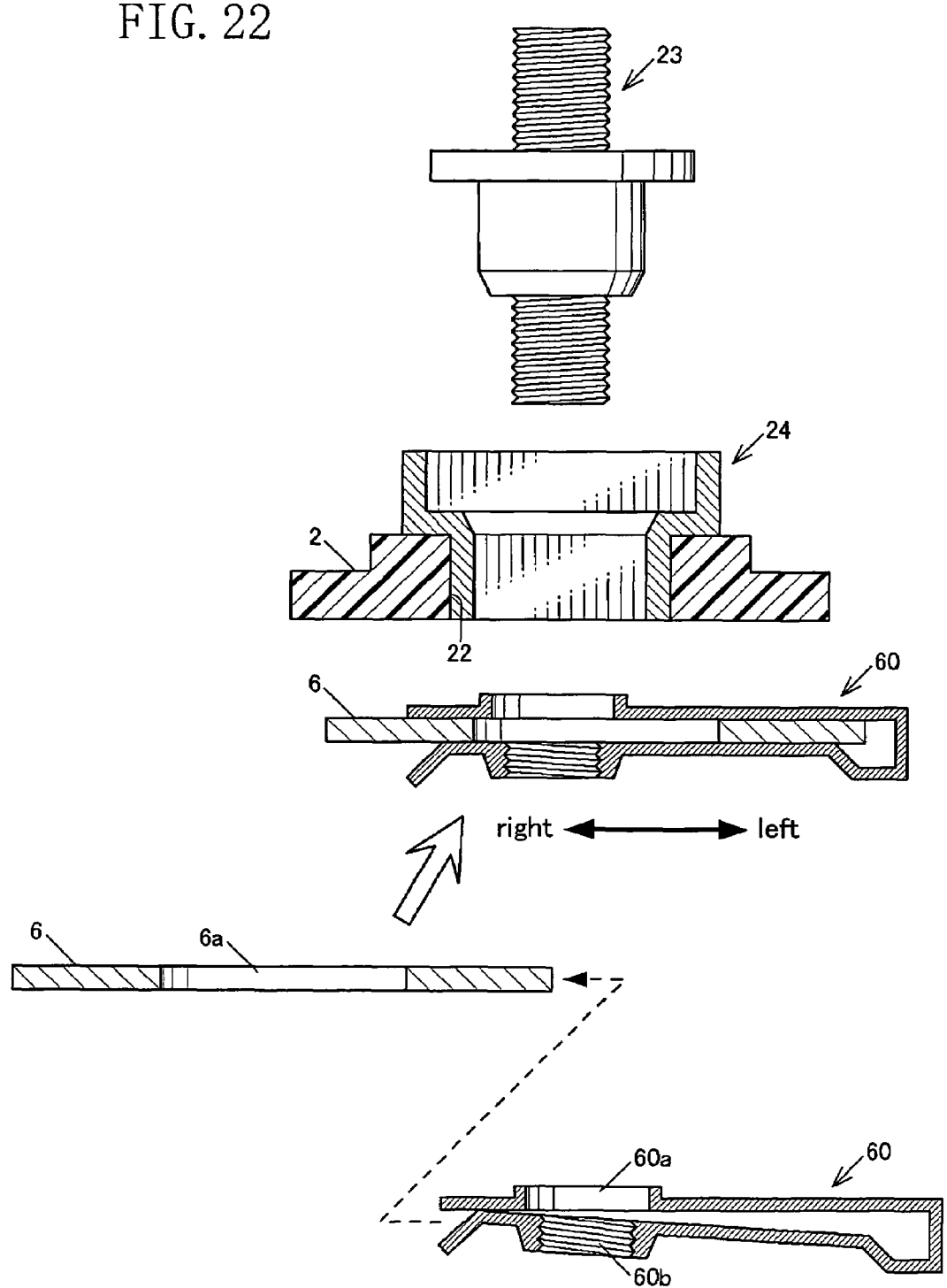
FIG. 22 is a corresponding view of FIG. 5 in the case of using a clip nut.
Figure 23:
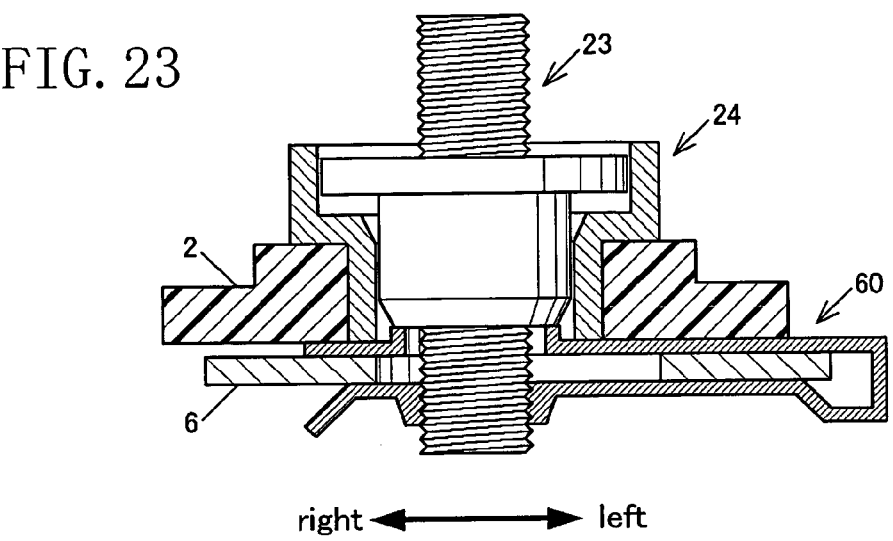
FIG. 23 is a corresponding view of FIG. 7 in the case of using the clip nut.

To cope with this, as shown in FIGS. 22 and 23, the apron frame 6 may be formed with an escape hole 6a extending in the right-to-left direction (the vehicle width direction) and the apron frame 6 may be sandwiched in the thickness direction by a clip nut 60. A portion of the upper part of the clip nut 60 to be located above the apron frame 6 (toward the fender panel 2) is formed with a through hole 60a into which the thread part 23c of the fastener 23 can be inserted. The lower part of the clip nut 60 is formed with a thread part 60b (car body member thread part) opposed to the through hole 60a. With the apron frame 6 sandwiched by the clip nut 60, the through hole 60a and the thread part 60b of the clip nut 60 can move in the right-to-left direction (vehicle width direction). Therefore, even if the apron frame 6 and the fender panel 2 are offset from each other in the vehicle width direction (the right-to-left direction in FIGS. 22 and 23), the fastener 23 can be reliably screwed into the thread part 60b of the clip nut 60 through the slot 22 and the spacer 24 by moving the clip nut 60 with respect to the apron frame 6 in the right-to-left direction.

The present invention is not limited to the structures described in the above embodiment and includes various other structures. For example, though in the above embodiment the weld nut 21 constituting a car body member thread part is placed on the opposite side of the apron frame 6 to the fender panel 2, it can be mounted on the side of the apron frame 6 facing toward the fender panel 2, like the weld nut 151 in the later-described second referential embodiment (see FIGS. 32 and 33). Thus, the weld nut 21 projects into the slot 22 of the fender panel 2 (also into the lower slot 24a of the spacer 24) and, therefore, the weld nut 21 can be also used as a guide member for guiding the movement of the fender panel 2.

In the above embodiment, the weld nut 21 constituting a car body member thread part has internal threads and the screw-engaged thread part 23c of the fastener 23 has external threads. Instead of this, like the later-described third referential embodiment (see FIGS. 34 and 35), a stud bolt having external threads may be provided to upstand from the surface of the apron panel 6 facing toward the fender panel 2 and a thread part having internal threads, instead of the thread part 23c having external threads, may be formed in the end surface of the first large diameter part 23b of the fastener 23 opposite to the threaded stem 23a.

Further, though the above embodiment describes the case where the resin panel to be mounted to the apron frame 6 which is a car body member is the fender panel 2, this invention is applicable to the door panels 4 (outer panels for side doors). In the case where the door panel 4 is formed of a resin panel, it is necessary to avoid that the front-to-rear distance between the rear edge of the fender panel 2 and the front edge of the door panel 4, which is an important factor in the appearance of the vehicle 1, does not almost change during thermal deformation of the door panel 4, namely, to restrict the displacement of the front edge of the door panel 4 in the vehicle front-to-rear direction due to its thermal deformation. To meet this objective, the direction of allowance of thermal deformation (the direction of the slot) is the vehicle width direction.

Resin panels applicable to the mounting structure and method of the invention are not limited to outer panels constituting the vehicle exterior and include inner panels constituting the vehicle interior and other resin panels to be subjected to high-temperature inducing processes, such as painting or paint film drying, after mounted to car body members.

REFERENTIAL INVENTION FOR THE PRESENT INVENTION

Next, a description will be given to a referential invention for the present invention.

If the object of the invention is only to prevent fasteners, such as bolts and nuts, for mounting the resin panel to the car body member from being dropped off and concurrently absorb large expansion and contraction of the resin panel relative to the car body member during painting process (namely, it is not intended to avoid peeling-off of the paint film from the fasteners' surfaces), the fastening nut may in the first place be screwed into the threaded stem of the fastener. In other words, the following bolt/nut assembly may be used to mount a resin vehicle panel to a car body member.

More specifically, the referential invention is directed to a bolt/nut assembly for use in mounting a resin panel for vehicles to a car body member, wherein the bolt/nut assembly has a configuration (first configuration) in which:

the car body member is provided with a car body member thread part having internal threads or external threads;

a portion of the resin panel corresponding to the car body member thread part is formed with a slot;

the bolt/nut assembly comprises: a bolt including a threaded stem, a large diameter part provided to one end of the threaded stem and insertable in the slot and a bolt thread part provided at an end surface of the large diameter part opposite to the threaded stem and screw-engageable with the car body member thread part; and a fastening nut preliminarily held on the threaded stem in screw engagement therewith at a predetermined distance from the large diameter part;

the large diameter part of the bolt is tightened against the car body member through screwing of the bolt thread part of the bolt onto or into the car body member thread part from toward the resin panel through the slot with the resin panel laid on the car body member with their associated portions; and the predetermined distance is set to allow a clearance to be created between the fastening nut and the resin panel with the large diameter part of the bolt tightened against the car body member.

According to the first configuration, when the bolt thread part is screwed forward onto or into the car body member thread part from toward the resin panel through the slot with the resin panel laid on the car body member with their associated portions, the large diameter part of the bolt is finally tightened against the car body member. In this state, the bolt/nut assembly comes to be firmly secured to the car body member. In addition, the fastening nut has been preliminarily held on the threaded stem in screw engagement. Therefore, even if vibrations or the like occur while the car body member is carried with the resin panel mounted thereto, the entire bolt/nut assembly or the fastening nut is prevented from dropping off.

Further, in this state, a clearance is created between the fastening nut and the resin panel, namely, the resin panel and the car body member are not fully fastened to each other. Therefore, if in this state the resin panel is subjected to a process inducing a very high temperature condition, such as a painting process, the resin panel expands relative to the car body member during the process and contracts during the later cooling. In these cases, since the bolt/nut assembly can move in and along the slot while being guided by the large diameter part, the resin panel moves relative to the car body member in the direction along the slot. This allows expansion and contraction of the resin panel due to heat during the painting or other high-temperature inducing processes, which prevents deformation or other defects of the resin panel. Furthermore, since the resin panel is at last secured to the car body member after the completion of the painting or other high-temperature inducing processes, this prevents the occurrence of deformation and residual internal stress of the resin panel due to a difference between the amount of expansion and the amount of contraction.

After the completion of such a high-temperature inducing process, the fastening nut is further screwed onto the threaded stem and tightened up, so that the resin panel is securely fastened to the car body member.

The bolt/nut assembly having the first configuration preferably has an additional configuration (second configuration) in which:

a frame-shaped spacer having a slot capable of receiving the large diameter part of the bolt is fitted in the slot of the resin panel;

the spacer has a larger thickness than a portion of the resin panel located around the periphery of the slot; and the fastening nut of the bolt/nut assembly is preliminarily held on the threaded stem at a position where the fastening nut does not abut on the spacer with the large diameter part of the bolt tightened against the car body member.

According to the second configuration, even with the spacer fitted in the slot of the resin panel, expansion and contraction of the resin panel due to heat during painting or other high-temperature inducing processes can be surely allowed. Further, when the fastening nut is screwed forward after the completion of such a high-temperature inducing process, the spacer is pressed against the car body member by the fastening nut. This avoids that the resin panel undergoes an excessive fastening force and thereby prevents damage or other inconveniences to the resin panel.

The bolt/nut assembly having the first configuration may have an additional configuration (third configuration) in which:

the car body member thread part is a stud bolt provided on the car body member to upstand therefrom; and the bolt thread part of the bolt of the bolt/nut assembly has internal threads screw-engageable with the stud bolt.

According to the third configuration, there is no need to form in the car body member a through hole for receiving the bolt thread part (an externally threaded screw), which eliminates a process for boring the car body member.

The referential invention is also directed to a method for mounting a resin panel for vehicles to a car body member, comprising the steps of:

providing the car body member with a car body member thread part having internal threads or external threads;

forming a slot in a portion of the resin panel corresponding to the car body member thread part;

fabricating a bolt/nut assembly comprising: a bolt including a threaded stem, a large diameter part provided to one end of the threaded stem and insertable in the slot and a bolt thread part provided at an end surface of the large diameter part opposite to the threaded stem and screw-engageable with the car body member thread part; and a fastening nut preliminarily held on the threaded stem in screw engagement therewith at a predetermined distance from the large diameter part;

tightening the large diameter part of the bolt against the car body member by screwing the bolt thread part onto or into the car body member thread part from toward the resin panel through the slot with the resin panel laid on the car body member with their associated portions in alignment of the car body member thread part with the slot;

subjecting the resin panel, with the large diameter part tightened against the car body member, to a predetermined process by which heat is applied to the resin panel; and after the step of subjecting the resin panel to the predetermined process, securely fastening the resin panel and the car body member with the fastening nut, wherein the predetermined distance is set to allow a clearance to be created between the fastening nut and the resin panel with the large diameter part of the bolt tightened against the car body member.

According to this method, in mounting the resin panel to the car body member, the same effects as described in respect to the first configuration can be attained.

The referential invention will be described in more detail with reference to referential embodiments which are embodiments of the referential invention.

First Referential Embodiment

Figure 24:
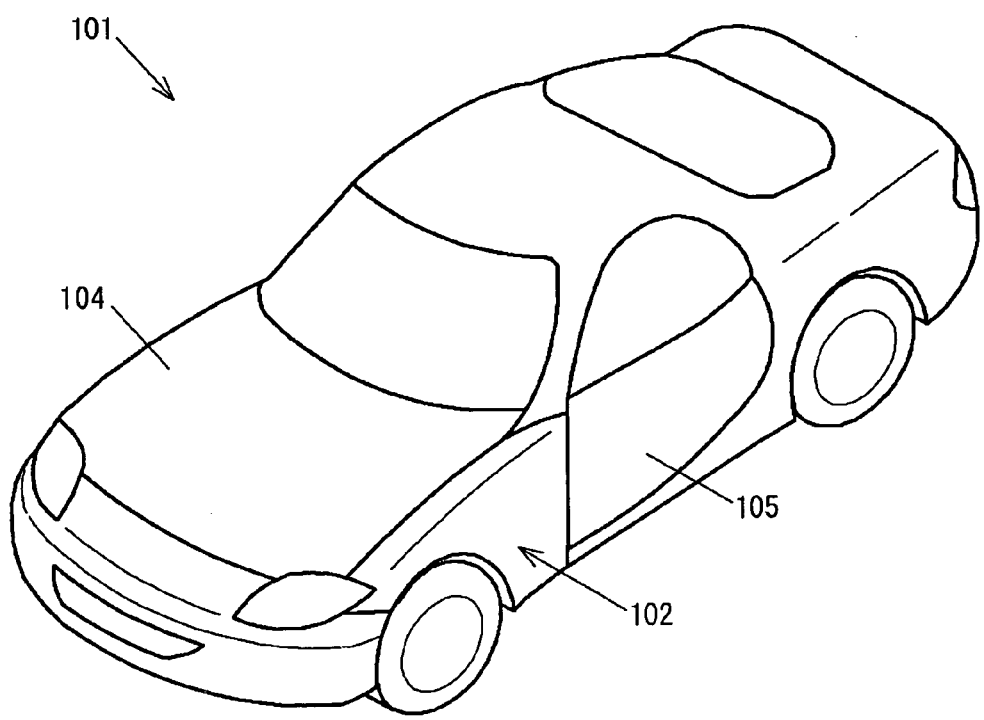
FIG. 24 is a perspective view of a vehicle employing a bolt/nut assembly according to a first referential embodiment of a referential invention related to the present invention.

FIG. 24 shows a general perspective view of a vehicle 101 using a bolt/nut assembly according to a first referential embodiment. Out of various panels (such as right and left fender panels 102, a hood panel 104 and right and left door panels 105) forming the exterior of the vehicle 101, the fender panels 102 (only the left one shown in FIG. 24) forming front right and front left parts of the exterior, like the fender panels 2, are made of resin for the purpose of vehicle weight reduction and the other panels are made of metal.

Figure 25:
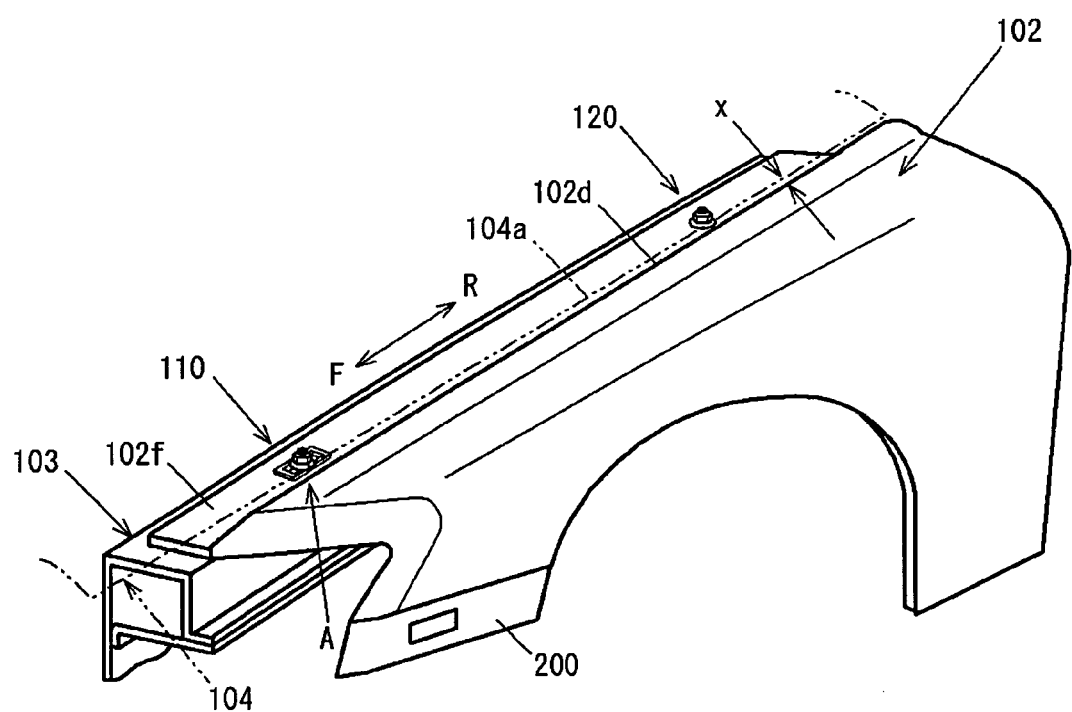
FIG. 25 is an enlarged perspective view showing a fender of the vehicle.

As shown in FIG. 25, the upper end of the fender panel 102 is provided with a flange 102f extending in the vehicle front-to-rear direction and a wheel apron reinforcement 103 (a car body member) made of metal is placed below the flange 102f to extend in the vehicle front-to-rear direction. The flange 102f is laid on the wheel apron reinforcement 103 and secured thereto at two mounting parts 110 and 120 (hereinafter referred to as a front mounting part 110 and a rear mounting part 120) located near the front and rear ends thereof, respectively. The front mounting part 110 plays the same role as the slidable part 20 of the vehicle 1. The flange 102f may be secured at three or more mounting parts (for example, five mounting parts) to the wheel apron reinforcement 103. Further, like the vehicle 1, the bumper mounting part 200 of the fender panel 102 may also be provided with a mounting part playing the same role as the slidable part 20.

Figure 26:
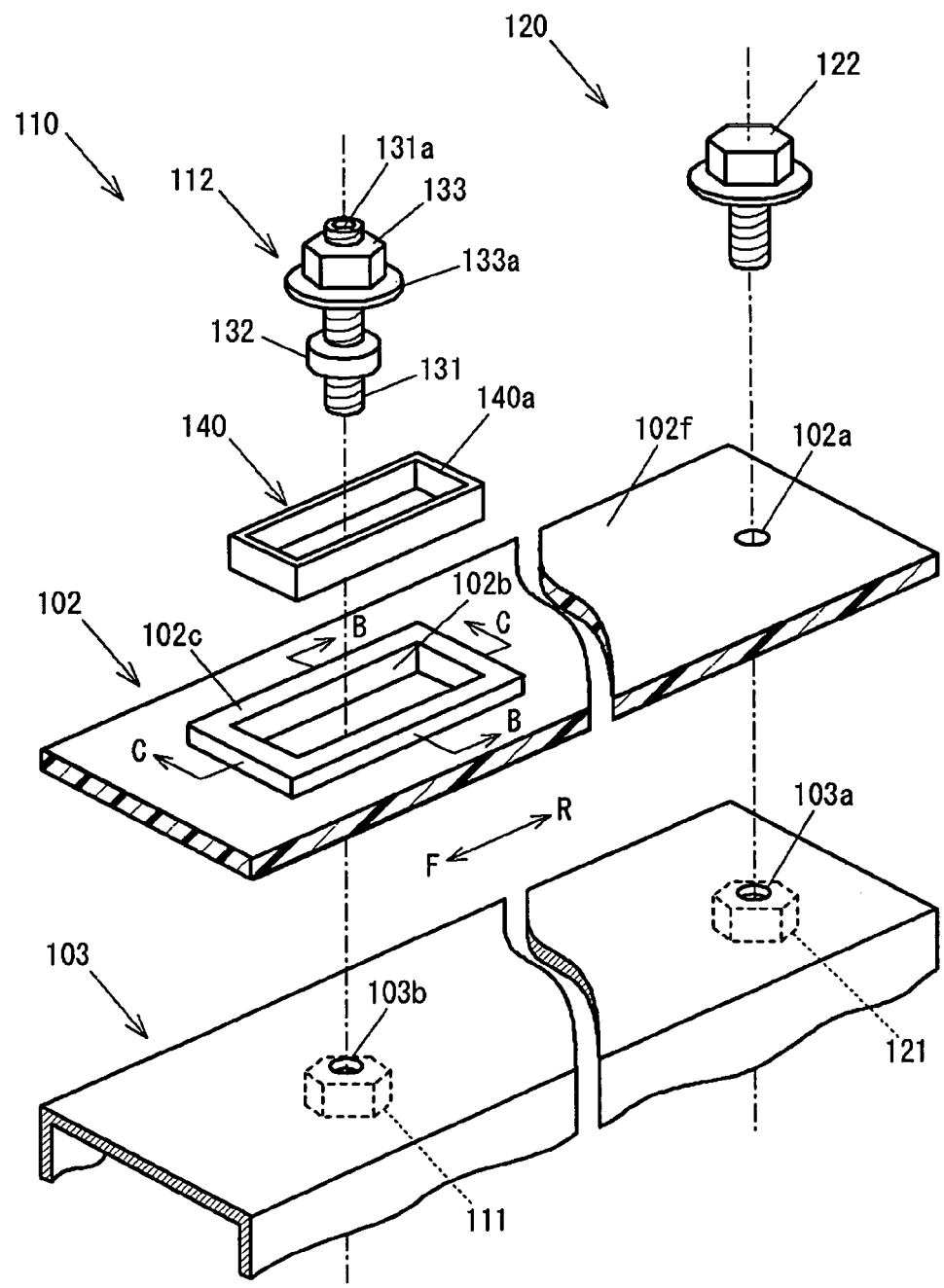
FIG. 26 is an enlarged, disassembled cross-sectional view of a part shown in the arrow A in FIG. 25.

As shown in FIG. 26, in the rear mounting part 120, round through holes 103a and 102a are formed in the wheel apron reinforcement 103 and the flange 102f of the fender panel 102, respectively, and a weld nut 121 is joined by welding to the bottom surface of the wheel apron reinforcement 103 (the surface thereof opposite to the fender panel 102) coaxially with the through hole 103a. The rear part of the flange 102f of the fender panel 102 can be secured to the wheel apron reinforcement 103 by screwing a bolt 122 into the weld nut 121 through the through holes 102a and 103a from toward the flange 102f of the fender panel 102.

On the other hand, in the front mounting part 110, a round through hole 103b is formed in the wheel apron reinforcement 103, a rectangular slot 102b extending in the vehicle front-to-rear direction is formed in the flange 102f of the fender panel 102 and a weld nut 111 (a car body member thread part) is joined by welding to the bottom surface of the wheel apron reinforcement 103 coaxially with the through hole 103b. The front part of the flange 102f of the fender panel 102 can be secured to the wheel apron reinforcement 103 using the bolt/nut assembly 112.

The longitudinal direction of the slot 102b is set to the direction of allowance of thermal deformation (expansion and contraction). Specifically, as shown in FIG. 25, the longitudinal direction of the slot 102b is set to the vehicle front-to-rear direction that is orthogonal to the vehicle width direction and shown in arrows F (Front) and R (Rear) in the figure. The reason for this is to keep the widthwise clearance x between the side edge 104a of the hood panel 104 and the upper edge (top) 102d of the fender panel 102 adjacent to the side edge 104a, which is an important factor in the exterior appearance of the vehicle 101, substantially constant, i.e., to restrict the widthwise displacement of the upper edge 102d of the fender panel 102 due to its thermal deformation.

Further, as shown in FIG. 26, in order to increase the rigidity of the portion of the fender panel 102 around the periphery of the slot 102b, the fender panel 102 is provided with a step 102c thicker than the flange 102f to surround the slot 102b.

The slot 102b is shaped to receive a rectangular frame-shaped metal spacer 140 with a close fit thereon. The spacer 140 has an outer size a predetermined amount smaller than the inner size of the slot 102b. The reason for this is to absorb expansion and contraction of the spacer 140 and the slot 102b due to natural environmental temperature changes.

Figure 27:
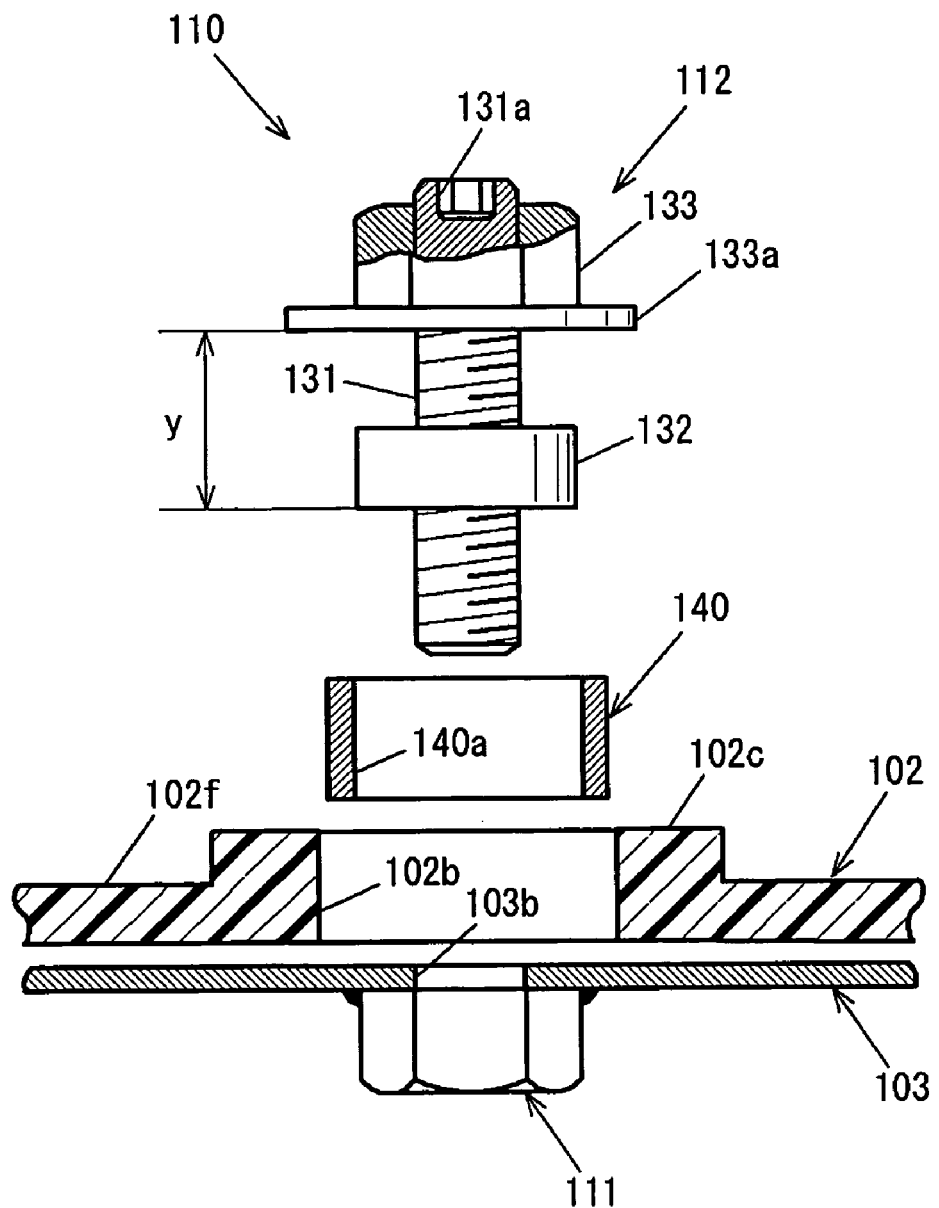
FIG. 27 is a cross-sectional view taken along the line B-B of FIG. 26.
Figure 28:
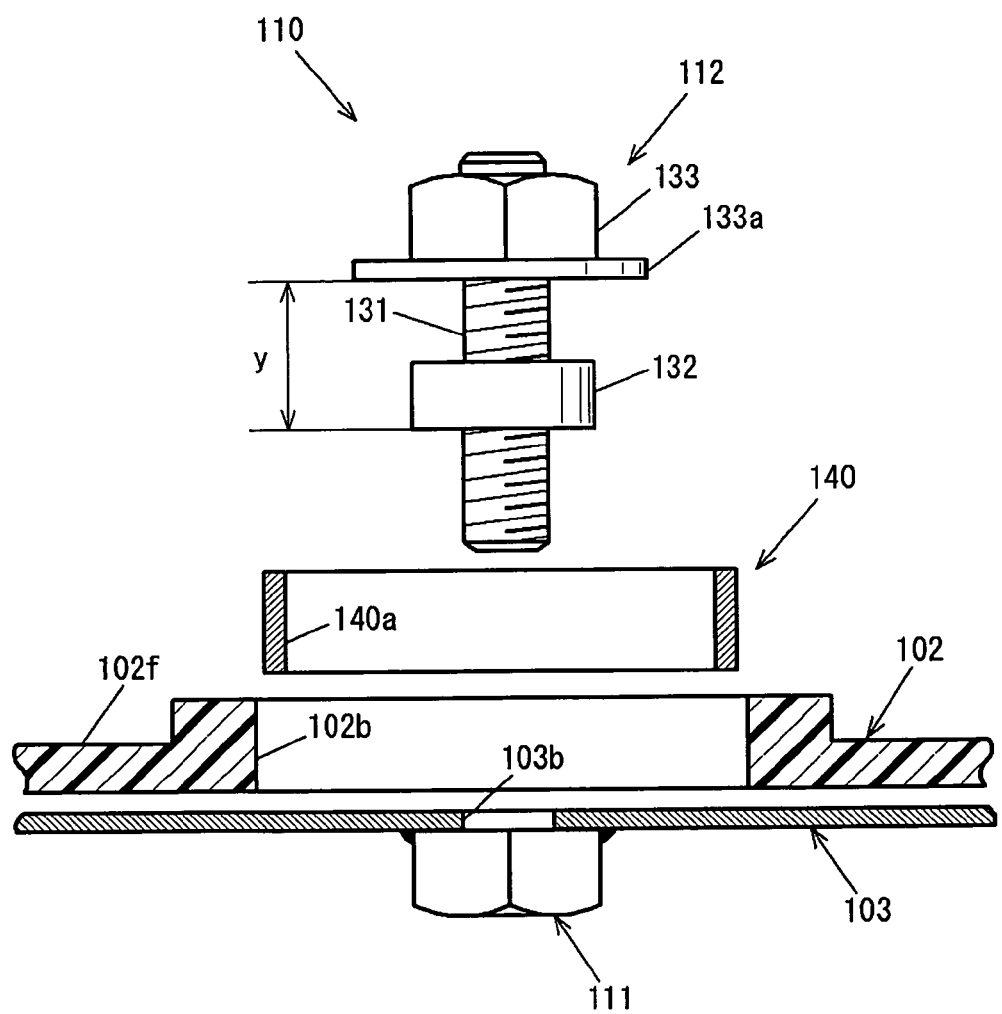
FIG. 28 is a cross-sectional view taken along the line C-C of FIG. 26.

Next, a description is given to the bolt/nut assembly 112. As shown in FIGS. 27 and 28, the bolt/nut assembly 112 has a hexagonal socket set screw (a bolt) 131, a round nut 132 larger in diameter than the hexagonal socket set screw 131 and a fastening nut 133. The hexagonal socket set screw 131 has no head but has a hexagonal socket 131a formed in one end surface and external threads formed in the periphery for the entire length. The round nut 132 is fixed to the axial middle of the hexagonal socket set screw 131 and shaped to be receivable in the slot 140a of the spacer 140 (namely, receivable in the slot 102b of the fender panel 102). The fastening nut 133 is preliminarily held on the hexagonal socket set screw 131 at a predetermined distance y from the round nut 132 (later described in detail in relation to the mounting method). A portion of the hexagonal socket set screw 131 upper than the round nut 132 (a portion thereof onto which the fastening nut 133 is to be screwed) corresponds to a threaded stem, a portion thereof lower than the round nut 132 corresponds to a bolt thread part screw-engageable with a car body member thread part and the round nut 132 corresponds to a large diameter part.

The round nut 132 is screwed on the hexagonal socket set screw 131 down to a predetermined position and then fixed at the predetermined position by firmly caulking it in the radial or axial direction. The round nut 132 is shaped to have a diameter slightly smaller than the length of the short side of the slot 140a of the spacer 140 (the dimension thereof in the vehicle width direction). This is for the purpose of maximizing the accuracy of the mounting position of the fender panel 102 relative to the wheel apron reinforcement 103 in the vehicle width direction while ensuring the mobility of the round nut 132 serving as a guide member within the slot 140a. Instead of the round nut 132, a polygonal nut such as hexagonal nut or octagonal nut may be used. In this case, the polygonal nut employed is preferably one having a diameter that does not create a large gap in the vehicle width direction with the inner surfaces of the long sides of the slot 140a of the spacer 140. The fixing of the round nut 132 to the hexagonal socket set screw 131 may be implemented by, instead of caulking, welding or a combination of caulking and welding.

The fastening nut 133 is formed of a washer-faced nut having a round washer 133a. The fastening nut 133 is screwed on the hexagonal socket set screw 131 (threaded stem) down to a position to create the predetermined distance y and preliminarily held at the position by lightly compressively caulking the washer 133a in the radial direction. The caulking need only be made to an extent that the fastening nut 133 does not move at amplitudes of vibration produced when carried to the subsequent process stage singularly or together with the screw-engaged weld nut 111 and that it can be turned again using a tool or the like. In order to avoid that in case of turning-back of the fastening nut 133 opposite to the round nut 132, the fastening nut 133 drops off from the hexagonal socket set screw 131, a snap ring or a cotter pin may be attached to the end of the hexagonal socket set screw 131 opposite to the round nut 132 (the end thereof formed with the hexagonal socket 131a).

Next, a description is given to a method for mounting the fender panel 102 to the wheel apron reinforcement 103.

First, the flange 102f of the fender panel 102 is laid on the wheel apron reinforcement 103 from above and the alignment of the through holes 102a and 103a of the rear mounting part 120 and the alignment of the through hole 102b and the slot 103b of the front mounting part 110 are concurrently carried out.

Subsequently, the rear mounting part 120 is fixed. Specifically, the bolt 122 is inserted from above into the through holes 102a and 103a of the fender panel 102 and the wheel apron reinforcement 103 and the bolt 122 is screwed into the weld nut 111 on the bottom surface of the wheel apron reinforcement 103 to securely fasten the fender panel 102 and the wheel apron reinforcement 103 to each other.

Figure 29:
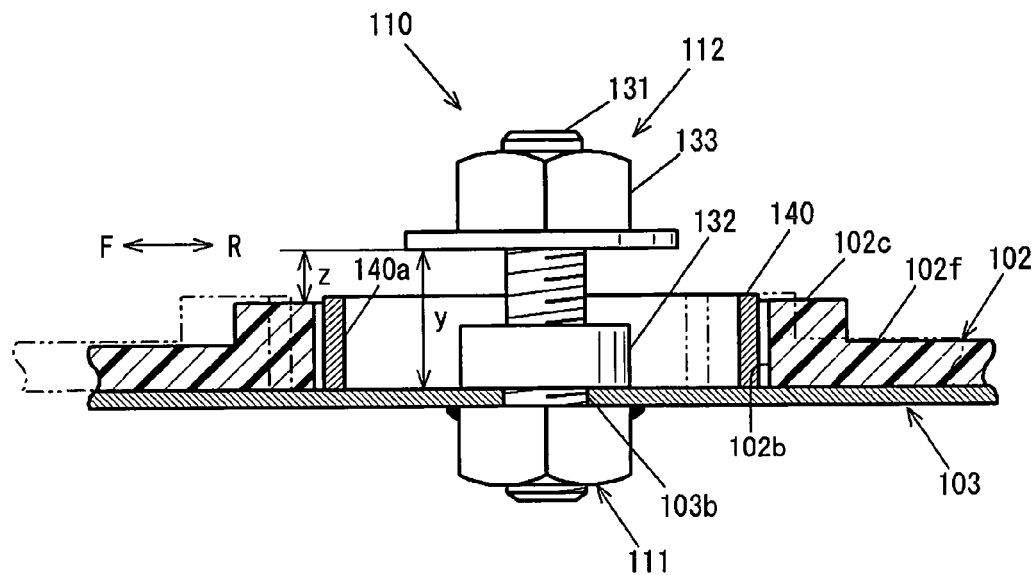
FIG. 29 is a corresponding view of FIG. 28, showing a state that a hexagonal socket set screw is screwed in a weld nut to tighten a round nut against a wheel apron reinforcement.
Figure 31:
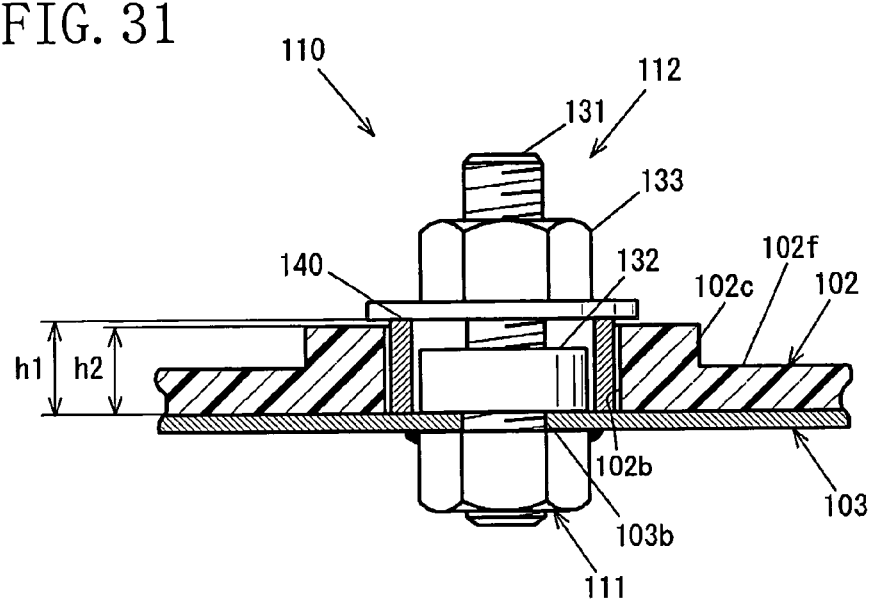
FIG. 31 is a corresponding view of FIG. 27, showing the state that the fastening nut is tightened up.

Next, the front mounting part 110 is dealt with. Specifically, as shown in FIG. 29, the spacer 140 is first fitted into the slot 102b of the flange 102f of the fender panel 102. The thickness h1 (height) of the spacer 140, as shown in FIG. 31, is larger than the thickness h2 of the step 102c of the fender panel 102 (the thickness of the portion of the fender panel 102 around the periphery of the slot 102b). Thus, when the spacer 140 is fitted in the slot 102b, the upper end of the spacer 140 extends beyond the top of the step 102c of the fender panel 102.

Next, the hexagonal socket set screw 131 of the bolt/nut assembly 112 is inserted from above (from toward the fender panel 102) into the slot 102b of the fender panel 102 and the through hole 103b of the wheel apron reinforcement 103 and the hexagonal socket set screw 131 is turned by an Allen wrench engaged in the hexagonal socket 131a, i.e., the entire bolt/nut assembly 112 is turned about the axis of the hexagonal socket set screw 131 to screw the hexagonal socket set screw 131 into the weld nut 111 on the bottom of the wheel apron reinforcement 103. The screwing is continued until the round nut 132 of the bolt/nut assembly 112 is tightened against the wheel apron reinforcement 103.

When the round nut 132 is tightened against the wheel apron reinforcement 103, a clearance z as shown in FIG. 29 is created between the fastening nut 133 and the step 102c of the fender panel 102. The predetermined distance y between the fastening nut 133 and the round nut 132 is set to allow the creation of the above clearance z. Further, the fastening nut 133 is preliminarily held at a position where it does not abut on the spacer 140 (a clearance is also created between the fastening nut 133 and the spacer 140) with the round nut 132 tightened against the wheel apron reinforcement 103.

Subsequently, the whole of a car body to which right and left fender panels 102 and other metal panels (such as a hood panel 104 and right and left door panels 105) are mounted is carried along the production line to a painting process area. During the time, in this referential embodiment, the round nut 132 of the bolt/nut assembly 112 is tightened against the wheel apron reinforcement 103 as described above, the entire bolt/nut assembly 112 is firmly secured to the wheel apron reinforcement 103 and the fastening nut 133 is preliminarily held on the hexagonal socket set screw 131. Therefore, even if vibrations or the like occur while the car body is carried with the fender panel 102 mounted to the wheel apron reinforcement 103, it can be prevented that the entire bolt/nut assembly 112 drops off from the wheel apron reinforcement 103 or the fastening nut 133 drops out of the hexagonal socket set screw 131.

Next, in the painting process area, the whole of the car body including the fender panel 102 undergoes a painting process which is a series of process steps including paint spraying, paint baking, paint film drying and cooling. The temperature during the paint baking in this case is set at a higher temperature (for example, approximately 180° C.) than the temperature (for example, approximately 120° C.) during paint baking to which a single fender panel 102 is subjected. The reason for this is to ensure that paint on the other metal panels is baked.

As described above, since the fender panel 102 is made of resin, it expands more than the wheel apron reinforcement 103 made of metal during paint baking and paint film drying in the painting process and contracts more during the later cooling. During the expansion and contraction, at the front mounting part 110, the clearance z exists between the fastening nut 133 and the fender panel 102 and the fastening nut 133 does not abut on the spacer 140. In fact, the fender panel 102 and the wheel apron reinforcement 103 are not fully fastened to each other and the bolt/nut assembly 112 is inserted in the slot 102b of the fender panel 102 (also in the slot 140a of the spacer 140). Therefore, when the fender panel 102 expands largely during paint baking and paint film drying in the painting process, the front part of the fender panel 102 moves in the direction F relative to the wheel apron reinforcement 103, as shown in the imaginary line in FIG. 29, with respect to the rear mounting part 120 while being guided by the round nut 132 fitted in the slot 102b (the slot 140a) formed in the front part thereof. In contrast, when the fender panel 102 contracts during the later cooling, the front part thereof moves in the direction R relative to the wheel apron reinforcement 103. Thus, the above configuration allows large expansion and contraction of the fender panel 102 due to heat produced in the painting process. This prevents the occurrence of deformation of the fender panel 102, such as bowing, and residual internal stress thereof.

Figure 30:
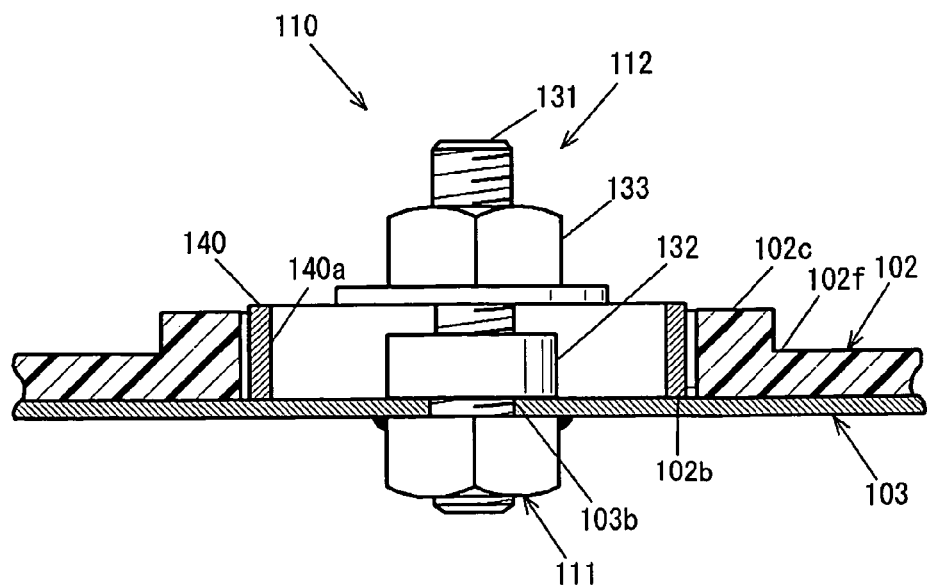
FIG. 30 is a corresponding view of FIG. 28, showing a state that a fastening nut is tightened up.

After the completion of the painting process, as shown in FIGS. 30 and 31, the fastening nut 133 is screwed down to its final position to securely fasten the fender panel 102 and the wheel apron reinforcement 103. In this referential embodiment, as described above, the metal spacer 140 is fitted in the slot 102b of the fender panel 102 and the thickness (height) h1 of the spacer 140 is greater than the thickness h2 of the step 102c of the fender panel 102. Therefore, while being screwed forward into the final position, the fastening nut 133 abuts on the top end surface of the spacer 140 and the spacer 140 is then pressed against the wheel apron reinforcement 103 by the fastening nut 133. This avoids that the portion of the fender panel 102 around the periphery of the slot 102b (including the step 102c) undergoes an excessive fastening force and thereby prevents damage or other inconveniences to the fender panel 102. Though FIG. 31 exaggerates the difference between the thickness h1 of the spacer 140 and the thickness h2 of the step 102c of the fender panel 102 for ease of viewing, it actually suffices if the difference is established to the degree that no jounce is produced between the fender panel 102 and the wheel apron reinforcement 103 and the fender panel 102 can slide on the wheel apron reinforcement 103.

In the present referential embodiment, since after the completion of the painting process the fender panel 102 is at last secured to the wheel apron reinforcement 103, this prevents the occurrence of deformation and residual internal stress of the fender panel 102 due to a difference between the amount of expansion and the amount of contraction thereof.

Further, between the spacer 140 and the slot 102b of the fender panel 102, a clearance is left for absorbing expansion and contraction of the fender panel 102 in the vehicle front-to-rear direction due to natural environmental temperature changes. Thus, even if the fender panel 102 expands and contracts owing to natural environmental temperature changes after mounted to the wheel apron reinforcement 103, such expansion and contraction can be absorbed well.

Second Referential Embodiment

Next, a second referential embodiment of the referential invention is described. Here, the description is given mainly of the structure of the front mounting part different from that in the first referential embodiment and no description is given of the basic structure of the vehicle 101 and the structures of the fender panel 102, the wheel apron reinforcement 103, the rear mounting part 120 and the spacer 140. When referred to in the following description, the same parts are identified by the same reference characters as in the first referential embodiment. This is applied to the later-described third referential embodiment.

Figure 32:
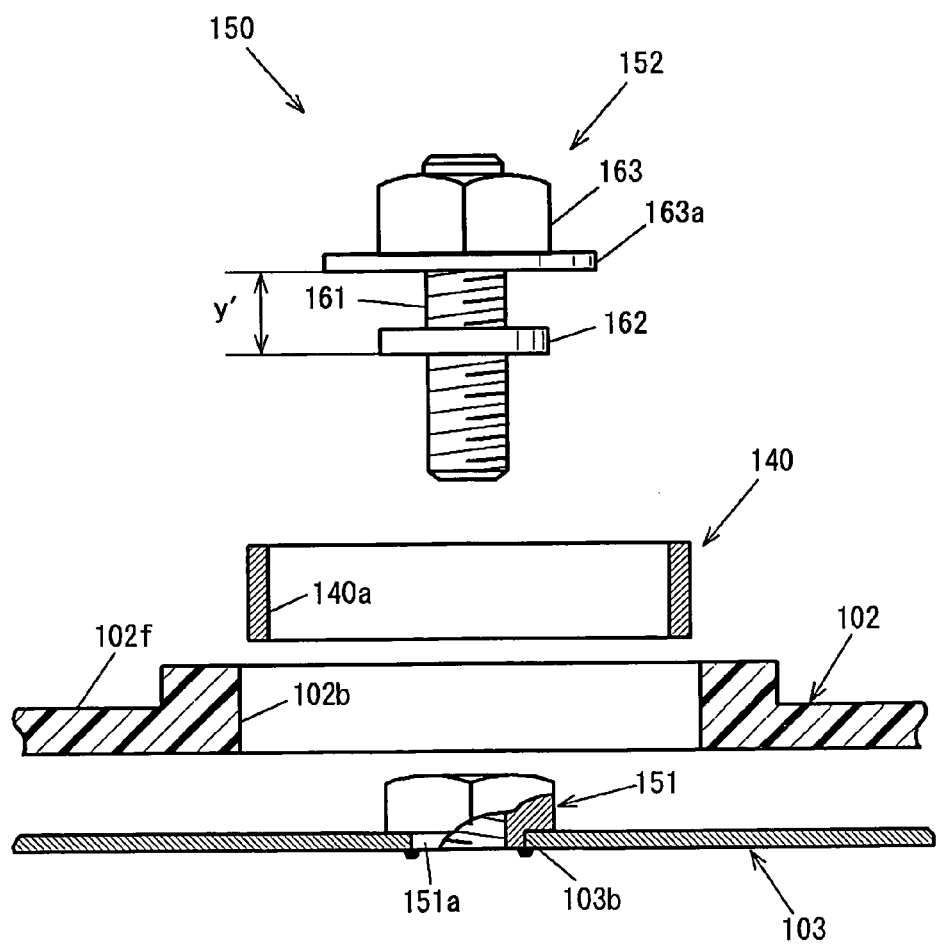
FIG. 32 is a corresponding view of FIG. 28, showing a second referential embodiment.

FIG. 32 shows the second referential embodiment. At the front mounting part 150 in the second referential embodiment, a weld nut 151 forming a car body member thread part is provided on the surface of the wheel apron reinforcement 103 facing toward the fender panel 102 and a cylindrical part 151a extending from the bottom of the weld nut 151 is fitted in the through hole 103b of the wheel apron reinforcement 103 and joined thereto by welding.

Further, like the first referential embodiment, a bolt/nut assembly 152 has a hexagonal socket set screw 161, a round nut 162 screw-engaged on the hexagonal socket set screw 161 and a washer-faced fastening nut 163 screw-engaged on the hexagonal socket set screw 161 at a predetermined distance y' from the round nut 162. Both the nuts 162 and 163 are subjected to the same caulking process as in the first referential embodiment. The round nut 162 is reduced in thickness by the amount of projection of the weld nut 151 toward the fender panel 102 from the surface of the wheel apron reinforcement 103 facing the fender panel 102.

Figure 33:
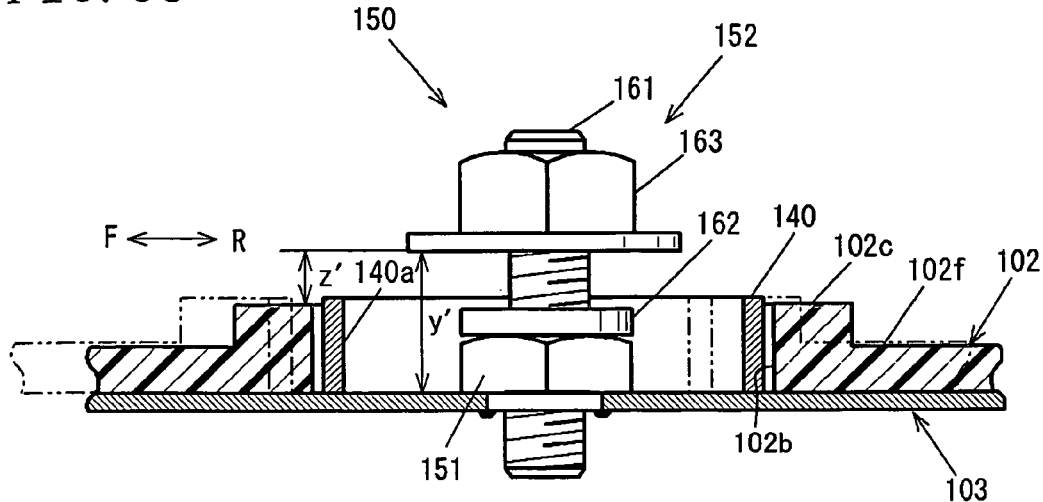
FIG. 33 is a corresponding view of FIG. 29, showing the second referential embodiment.

The predetermined distance y' between the fastening nut 163 and the round nut 162 is set as follows. As shown in FIG. 33, the fender panel 102 is laid on the wheel apron reinforcement 103 with their associated portions so that the weld nut 151 of the wheel apron reinforcement 103 is fitted into the slot 140a of the spacer 140 (i.e., into the slot 102b of the fender panel 102). In this state, the hexagonal socket set screw 161 of the bolt/nut assembly 152 is screwed into the weld nut 151 of the wheel apron reinforcement 103 from toward the fender panel 102 through the slot 140a of the spacer 140 to tighten the round nut 162 against the weld nut 151. The predetermined distance y' is set so that a clearance z' is created between the fastening nut 163 and the step 102c of the fender panel 102 with the round nut 162 tightened against the weld nut 151. In addition, the spacer 140 is configured so that with the round nut 162 tightened against the weld nut 151, the fastening nut 163 does not abut on the spacer 140.

Thus, like the first referential embodiment, also in the second referential embodiment, even if vibrations or the like occur while the car body is carried with the fender panel 102 mounted to the wheel apron reinforcement 103, the entire bolt/nut assembly 152 or the fastening nut 163 can be prevented from dropping off. Further, when the fender panel 102 thermally expands, it moves in the direction F relative to the wheel apron reinforcement 103 as shown in the imaginary line in FIG. 33. When the fender panel 102 thermally contracts, it moves in the direction R. Therefore, the above configuration allows expansion and contraction of the fender panel 102 due to heat produced in the painting process.

After the completion of the painting process, the fastening nut 163 is screwed down to its final position to securely fasten the fender panel 102 and the wheel apron reinforcement 103. Also in the second referential embodiment, between the spacer 140 and the slot 102b of the fender panel 102, a clearance is left for absorbing expansion and contraction of the fender panel 102 in the vehicle front-to-rear direction due to natural environmental temperature changes. Thus, expansion and contraction of the fender panel 102 due to natural environmental temperature changes can be absorbed well.

Particularly in the second referential embodiment, the weld nut 151 projects within the slot 102b of the fender panel 102 (i.e., within the slot 140a of the spacer 140), the weld nut 151 can also be used as a guide member for guiding the movement of the fender panel 102.

Third Referential Embodiment

Next, a description is given of a third referential embodiment of the referential invention.

Figure 34:
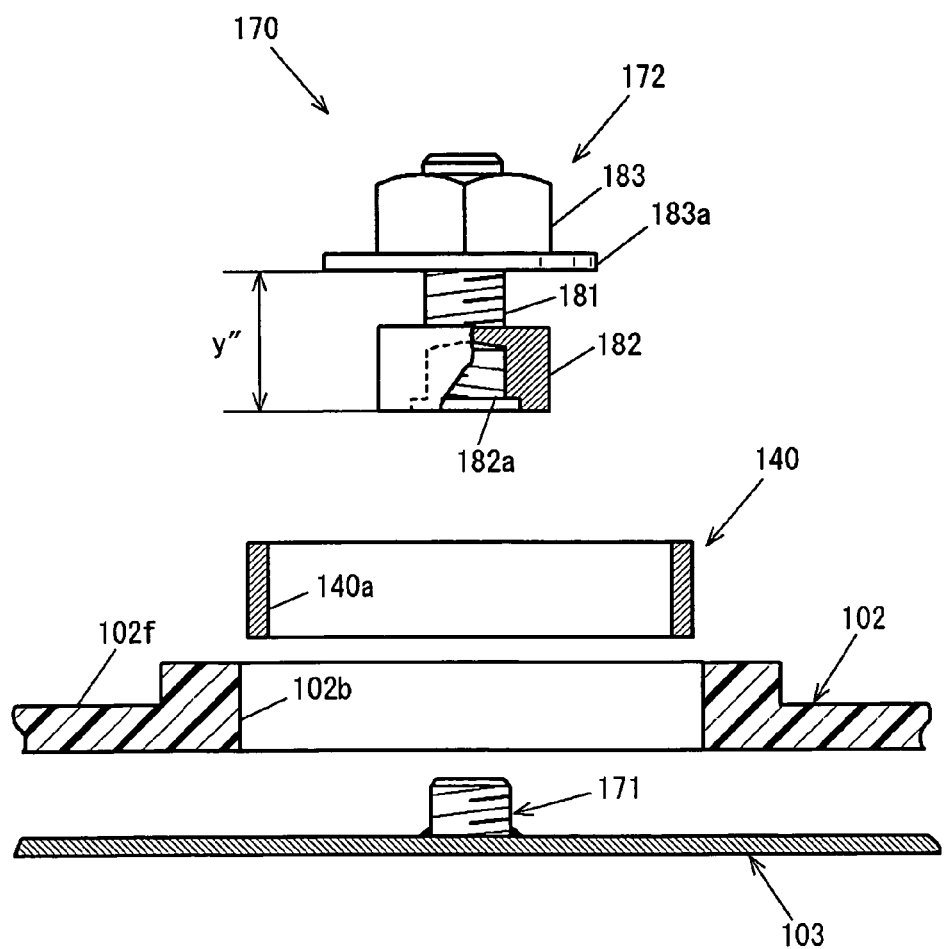
FIG. 34 is a corresponding view of FIG. 28, showing a third referential embodiment.

FIG. 34 shows the third referential embodiment. At the front mounting part 170 in the third referential embodiment, no through hole is formed in the wheel apron reinforcement 103 and a stud bolt 171 is instead joined by welding to the surface of wheel apron reinforcement 103 facing the fender panel 102 to upstand therefrom.

Further, a bolt/nut assembly 172 has a hexagonal socket set screw 181, a round member 182 fixed to one end of the hexagonal socket set screw 161 (the end thereof opposite to the hexagonal socket) and a washer-faced fastening nut 183 screw-engaged on the hexagonal socket set screw 181 at a predetermined distance y" from the round member 182. The washer 183a of the fastening nut 183 is subjected to the same caulking process as in the first referential embodiment. The surface of the round member 182 opposite to the hexagonal socket set screw 181 (the bottom thereof) is formed with an internal thread part 182a screw-engageable on the stud bolt 171.

Figure 35:
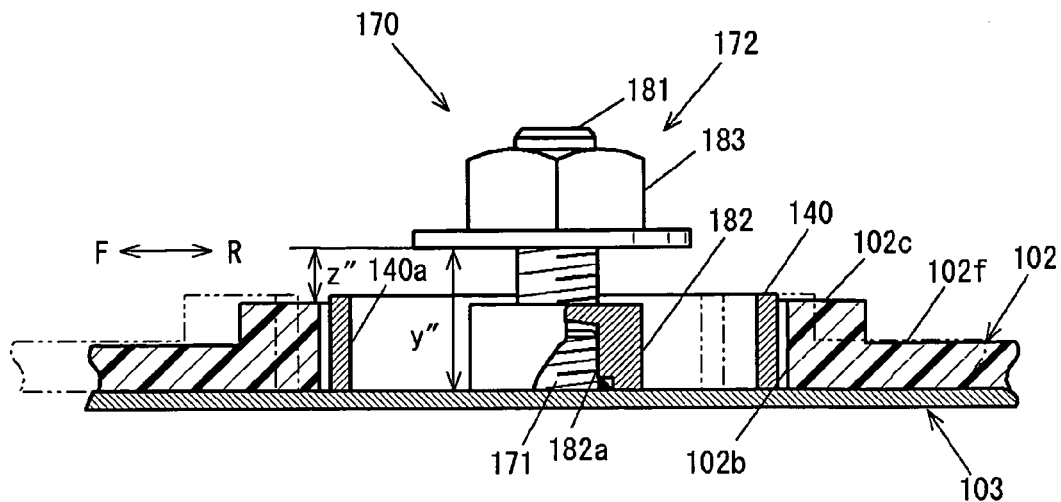
FIG. 35 is a corresponding view of FIG. 29, showing the third referential embodiment.

The predetermined distance y" between the fastening nut 183 and the round member 182 is set as follows. As shown in FIG. 35, the fender panel 102 is laid on the wheel apron reinforcement 103 with their associated portions so that the stud bolt 171 on the wheel apron reinforcement 103 is fitted into the slot 140a of the spacer 140 (i.e., into the slot 102 of the fender panel 102). In this state, the internal thread part 182a of the round member 182 of the bolt/nut assembly 172 is screwed onto the stud bolt 171 to tighten the round member 182 to the wheel apron reinforcement 103. The predetermined distance y" is set so that a clearance z" is created between the fastening nut 183 and the fender panel 102 with the round member 182 tightened against the wheel apron reinforcement 103. In addition, the spacer 140 is configured so that with the round member 182 tightened against the wheel apron reinforcement 103, the fastening nut 183 does not abut on the spacer 140.

Thus, like the first and second referential embodiments, also in the third referential embodiment, even if vibrations or the like occur while the car body is carried with the fender panel 102 mounted to the wheel apron reinforcement 103, the entire bolt/nut assembly 172 or the fastening nut 183 can be prevented from dropping off. Further, when the fender panel 102 thermally expands, it moves in the direction F relative to the wheel apron reinforcement 103 as shown in the imaginary line in FIG. 35. When the fender panel 102 thermally contracts, it moves in the direction R. Therefore, the above configuration allows expansion and contraction of the fender panel 102 due to heat produced in the painting process.

After the completion of the painting process, the fastening nut 183 is screwed down to its final position to securely fasten the fender panel 102 and the wheel apron reinforcement 103. Also in the third referential embodiment, between the spacer 104 and the slot 102b of the fender panel 102, a clearance is left for absorbing expansion and contraction of the fender panel 102 in the vehicle front-to-rear direction due to natural environmental temperature changes. Thus, expansion and contraction of the fender panel 102 due to natural environmental temperature changes can be absorbed well.

Particularly in the third referential embodiment, it is not necessary that the wheel apron reinforcement 103 is formed with a through hole for the front mounting part 170. This saves labor for boring process.

Figure 36:
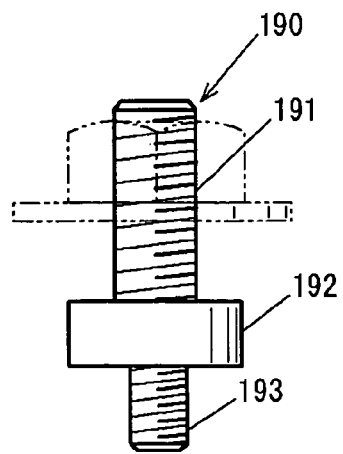
FIG. 36 is a side view showing another example of a bolt of the bolt/nut assembly.

In the first to third referential embodiments, the bolt of the bolt/nut assembly 112 (152, 172) is formed of two components, i.e., a hexagonal socket set screw 131 (161, 181) and a round nut 132 (162) or a round member 182. Instead of two components, as shown in FIG. 36, the bolt/nut assembly may be formed using a bolt 190 that is made from one blank by cutting and has a threaded stem 191, a large diameter part 192 and a bolt thread part 193.

Though the above referential embodiments describe the case where the resin panel to be mounted to the wheel apron reinforcement 103 which is a car body member is the fender panel 102, this referential invention is applicable to door panels 105 (outer panels for side doors).

Resin panels applicable to the mounting structures and methods described in the above referential embodiments are not limited to outer panels constituting the vehicle exterior and include inner panels constituting the vehicle interior and other resin panels to be subjected to high-temperature inducing processes, such as painting, after mounted to car body members.

What is claimed is:

1. A resin vehicle panel mounting structure in which a resin panel for vehicles is mounted to a car body member, wherein
   the car body member is provided with a car body member thread part having internal threads or external threads,
   a portion of the resin panel corresponding to the car body member thread part is formed with a slot extending along a direction of allowance of thermal deformation of the resin panel,
   the resin vehicle panel mounting structure comprises a fastener including:
   a threaded stem;
   a first large diameter part provided to one end of the threaded stem and inserted in the slot; and
   a fastener thread part provided at an end surface of the first large diameter part opposite to the threaded stem and screw-engaged with the car body member thread part,
   wherein the threaded stem of the fastener is provided with a second large diameter part having a larger diameter than the first large diameter part,
   wherein the first large diameter part is tightened against the car body member through screwing of the fastener thread part onto or into the car body member thread part, and
   wherein a clearance is created between the second large diameter part and the resin panel with the first large diameter part tightened against the car body member.

2. A resin vehicle panel mounting structure in which a resin panel for vehicles is mounted to a car body member, wherein the car body member is provided with a car body member thread part having, internal threads or external threads
   a portion of the resin panel corresponding to the car body member thread part is formed with a slot extending along a direction of allowance of thermal deformation of the resin panel,
   the resin vehicle panel mounting structure comprises a fastener including:
   a threaded stem,
   a first large diameter part provided to one end of the threaded stem and inserted in the slot; and
   a fastener thread part provided at an end surface of the first large diameter part opposite to the threaded stem and screw-engaged with the car body member thread part,
   wherein the threaded stem of the fastener is provided with a second large diameter part having a larger diameter than the first large diameter part;
   a frame-shaped spacer having a higher compressive creep strength than the resin panel is fitted in the slot of the resin panel,
   the spacer is formed with a first slot in which the first large diameter part of the fastener is inserted and a second slot in which the second large diameter part thereof is inserted, the first and second slots joining in the direction of thickness of the spacer and extending along the slot of the resin panel, and
   a portion of the spacer formed with the first slot is designed to have substantially the same thickness as a portion of the resin panel formed with the slot.

3. The resin vehicle panel mounting structure of claim 1, further comprising a thermal contraction restricting part for restricting thermal contraction of the resin panel over a predetermined amount.

4. The resin vehicle panel mounting structure of claim 3, wherein the thermal contraction restricting part is configured to restrict the thermal contraction of the resin panel over the predetermined amount by the abutment of the fastener screw-engaged with the car body member thread part against one end of the slot of the resin panel.

5. The resin vehicle panel mounting structure of claim 2, further comprising a thermal contraction restricting part for restricting thermal contraction of the resin panel over a predetermined amount.

6. The resin vehicle panel mounting structure of claim 5, wherein the thermal contraction restricting part is configure to restrict the thermal contraction of the resin panel over the predetermined amount by the abutment of the fastener screw-engaged with the car body member thread part against one end of the slot of the resin panel.

* * * * *